US012615559B2

(12) United States Patent
Cui et al.

(10) Patent No.: US 12,615,559 B2
(45) Date of Patent: Apr. 28, 2026

(54) FACILITATING NETWORK SLICING INFORMATION PRESERVATION IN ADVANCED NETWORKS

(71) Applicant: AT&T Intellectual Property I, L.P., Atlanta, GA (US)

(72) Inventors: Zhi Cui, Sugar Hill, GA (US); Hongyan Lei, Plano, TX (US); Ye Chen, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 774 days.

(21) Appl. No.: 18/045,875

(22) Filed: Oct. 12, 2022

(65) Prior Publication Data
US 2024/0129808 A1     Apr. 18, 2024

(51) Int. Cl.
*H04W 36/00*          (2009.01)
*H04L 41/40*          (2022.01)

(52) U.S. Cl.
CPC ......... *H04W 36/0033* (2013.01); *H04L 41/40* (2022.05)

(58) Field of Classification Search
CPC ............... H04W 36/0033; H04L 41/40; H04L 41/0894; H04L 41/16; H04L 41/0895
See application file for complete search history.

(56) References Cited

U.S. PATENT DOCUMENTS

| | | | | |
|---|---|---|---|---|
| 10,129,108 B2 * | 11/2018 | Vrzic | ...................... | H04L 41/40 |
| 10,299,128 B1 * | 5/2019 | Suthar | ..................... | H04W 8/02 |
| 10,602,320 B2 * | 3/2020 | Shaw | .................. | H04L 63/0815 |
| 11,258,689 B2 * | 2/2022 | Kodaypak | ........... | H04L 47/2416 |
| 12,041,691 B2 * | 7/2024 | Landais | ................ | H04W 24/02 |
| 2007/0275726 A1 * | 11/2007 | Lee | ................... | H04W 36/0055 455/436 |
| 2019/0373520 A1 * | 12/2019 | Sillanpää | .............. | H04W 36/14 |
| 2020/0186433 A1 * | 6/2020 | Cui | ...................... | H04W 24/02 |
| 2020/0252862 A1 * | 8/2020 | Kim | ....................... | H04W 8/08 |
| 2020/0404480 A1 * | 12/2020 | Zhu | ....................... | H04W 48/12 |
| 2021/0112428 A1 * | 4/2021 | Young | ................. | H04L 41/0895 |

(Continued)

FOREIGN PATENT DOCUMENTS

| | | | | | |
|---|---|---|---|---|---|
| CN | 108366369 A | * | 8/2018 | ............ | H04W 12/08 |
| CN | 108616959 A | * | 10/2018 | ............ | H04W 48/18 |

(Continued)

*Primary Examiner* — Michael A Keller
(74) *Attorney, Agent, or Firm* — Guntin & Gust, PLC; John G. Rauch

(57)          ABSTRACT

Facilitating network slicing information preservation in advanced networks in advanced networks is provided herein. Operations of a system include receiving, from second network equipment, network slice configuration information for a user device during a first handover of the user device from the second network equipment to the first network equipment. The network slice configuration information can include information indicative of a first network slice and a second network slice generated via a microservice of a network intelligent controller. Further the operations can include transmitting, to third network equipment, the network slice configuration information for the user device during a second handover of the user device from the first network equipment to the third network equipment.

20 Claims, 15 Drawing Sheets

(56) References Cited

U.S. PATENT DOCUMENTS

| | | | | |
|---|---|---|---|---|
| 2021/0243653 A1* | 8/2021 | Shih | | H04W 48/14 |
| 2021/0345119 A1* | 11/2021 | Futaki | | H04W 76/27 |
| 2022/0264434 A1* | 8/2022 | Landais | | H04W 36/26 |
| 2022/0369196 A1* | 11/2022 | Kodaypak | | H04W 48/16 |
| 2022/0394607 A1* | 12/2022 | Ramle | | H04L 41/0806 |
| 2023/0199570 A1* | 6/2023 | Lee | | H04W 76/18 |
| | | | | 370/331 |
| 2023/0247716 A1* | 8/2023 | Hong | | H04W 28/0226 |
| 2023/0269655 A1* | 8/2023 | Parikh | | H04W 12/03 |
| | | | | 455/411 |
| 2024/0129808 A1* | 4/2024 | Cui | | H04L 41/40 |
| 2024/0267827 A1* | 8/2024 | Patel | | H04W 40/248 |
| 2024/0406694 A1* | 12/2024 | Satpathy | | H04W 4/50 |
| 2025/0113268 A1* | 4/2025 | Mane | | H04W 76/20 |
| 2025/0310183 A1* | 10/2025 | Nguyen | | H04L 65/1016 |

FOREIGN PATENT DOCUMENTS

| | | | | | | |
|---|---|---|---|---|---|---|
| CN | 108833181 A | * | 11/2018 | | | H04W 76/10 |
| CN | 109151924 A | * | 1/2019 | | | H04W 76/11 |
| CN | 109906630 A | * | 6/2019 | | | H04W 36/0033 |
| CN | 109936861 A | * | 6/2019 | | | |
| CN | 110035461 A | * | 7/2019 | | | H04W 76/16 |
| CN | 111052818 A | * | 4/2020 | | | H04W 60/00 |
| CN | 111586667 A | * | 8/2020 | | | H04W 48/10 |
| CN | 112425208 A | * | 2/2021 | | | H04W 36/13 |
| CN | 112448830 A | * | 3/2021 | | | H04L 41/0893 |
| CN | 114554598 A | * | 5/2022 | | | H04W 72/53 |
| CN | 110402588 B | * | 7/2022 | | | H04W 36/0069 |
| CN | 114916055 A | * | 8/2022 | | | H04W 76/11 |
| CN | 115225215 A | * | 10/2022 | | | H04L 41/0893 |
| CN | 115299110 A | * | 11/2022 | | | H04W 36/304 |
| CN | 115942415 A | * | 4/2023 | | | H04W 36/12 |
| CN | 116981045 A | * | 10/2023 | | | H04W 60/005 |
| CN | 117158049 A | * | 12/2023 | | | |
| CN | 117499238 A | * | 2/2024 | | | H04W 48/18 |
| CN | 114205883 B | * | 3/2024 | | | H04W 36/18 |
| CN | 117941388 A | * | 5/2024 | | | H04W 60/04 |
| CN | 118018415 A | * | 5/2024 | | | H04L 41/0879 |
| CN | 119563344 A | * | 3/2025 | | | H04W 48/14 |
| EP | 3403448 B1 | * | 3/2020 | | | H04W 24/02 |
| EP | 3713260 A1 | * | 9/2020 | | | H04W 12/30 |
| EP | 4033812 B1 | * | 11/2023 | | | H04W 12/06 |
| GB | 2600920 A | * | 5/2022 | | | H04W 4/00 |
| JP | 2023533626 A | * | 8/2023 | | | H04L 41/5051 |
| JP | 7455580 B2 | * | 3/2024 | | | H04W 12/06 |
| WO | WO-2017143047 A1 | * | 8/2017 | | | H04W 88/14 |
| WO | WO-2018145727 A1 | * | 8/2018 | | | H04W 60/00 |
| WO | WO-2018175498 A1 | * | 9/2018 | | | H04W 48/18 |
| WO | WO-2019182493 A1 | * | 9/2019 | | | H04W 4/24 |
| WO | WO-2020204949 A1 | * | 10/2020 | | | H04W 76/12 |
| WO | WO-2023213132 A1 | * | 11/2023 | | | H04W 40/02 |
| WO | WO-2024008320 A1 | * | 1/2024 | | | H04L 67/131 |
| WO | WO-2024173539 A2 | * | 8/2024 | | | H04W 36/008357 |

* cited by examiner

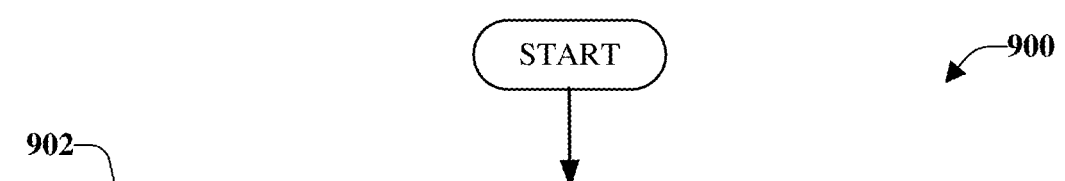

START

—900

902—

GENERATING, BY A SYSTEM COMPRISING A PROCESSOR, NETWORK SLICES FOR A USER EQUIPMENT BASED ON A SERVICE BEING EXECUTED AT THE USER EQUIPMENT, WHEREIN THE GENERATING COMPRISES EMPLOYING A FIRST MICROSERVICE AT A FIRST NETWORK INTELLIGENT CONTROLLER AND A SECOND MICROSERVICE AT A SECOND NETWORK INTELLIGENT CONTROLLER

904—

BASED ON A FIRST DETERMINATION THAT A USER EQUIPMENT IS TO BE HANDED OVER FROM FIRST NETWORK EQUIPMENT TO SECOND NETWORK EQUIPMENT, FACILITATING, BY THE SYSTEM, A FIRST TRANSMISSION THAT COMPRISES FIRST INFORMATION INDICATIVE OF A FIRST HANDOVER FROM THE FIRST NETWORK EQUIPMENT TO THE SECOND NETWORK EQUIPMENT AND SECOND INFORMATION INDICATIVE OF A NETWORK SLICING CONFIGURATION ESTABLISHED FOR THE USER EQUIPMENT PRIOR TO THE FIRST HANDOVER

906—

BASED ON A SECOND DETERMINATION THAT THE USER EQUIPMENT IS TO BE HANDED OVER FROM THE SECOND NETWORK EQUIPMENT TO THIRD NETWORK EQUIPMENT, FACILITATING, BY THE SYSTEM, A SECOND TRANSMISSION THAT COMPRISES THIRD INFORMATION INDICATIVE OF A SECOND HANDOVER FROM THE SECOND NETWORK EQUIPMENT TO THE THIRD NETWORK EQUIPMENT AND THE SECOND INFORMATION INDICATIVE OF THE NETWORK SLICING CONFIGURATION ESTABLISHED FOR THE USER EQUIPMENT PRIOR TO THE FIRST HANDOVER

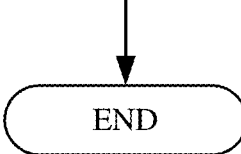

END

MOBILE NETWORK PLATFORM

| CS GATEWAY NODE(S) 1312 | PS GATEWAY NODE(S) 1318 |
|---|---|

| SERVER(S) 1314 | SERVING NODE(S) 1316 |
|---|---|

RAN

1375

MEMORY

1330

1340

TELEPHONY NW(S)

WAN
1350

SS7 NETWORK
1360

ENTERPRISE NW(S)
1370

SERVICE NW(S)
1380

1400

MOBILE HANDSET

APPLICATIONS — 1406

CLIENT (STORE, DISCOVERY, PLAY) — 1442

TRIGGER COMPONENT — 1438

HYSTERESIS COMPONENT — 1436

SIP CLIENT — 1440

FIRMWARE — 1408

VIDEO COMP — 1430

DISPLAY — 1412

CAMERA — 1422

SERIAL I/O INTERFACE — 1414

USER INPUT — 1434

PROCESSOR — 1402

MEMORY — 1404

AUDIO I/O — 1416

SUBSCRIBER IDENTITY SYSTEM — 1418 1420

COMMUNICATION COMPONENT — 1410

CELL TCVR — 1411

WIFI TCVR — 1413

LOCATION COMPONENT — 1432

POWER SOURCE — 1424

POWER I/O — 1426

FACILITATING NETWORK SLICING INFORMATION PRESERVATION IN ADVANCED NETWORKS

TECHNICAL FIELD

This disclosure relates generally to the field of mobile communications and, for example, to metaverse services and network slicing in advanced networks, e.g., Fourth Generation (4G) networks, Fifth Generation (5G) networks, Sixth Generation (6G) networks, or beyond.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G), Sixth Generation (6G), or other advanced standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which:

FIG. 9 illustrates an example, non-limiting, computer-implemented method for facilitating conditional fast return with slicing configuration information preservation in accordance with one or more embodiments described herein;

DETAILED DESCRIPTION

Figure 1:
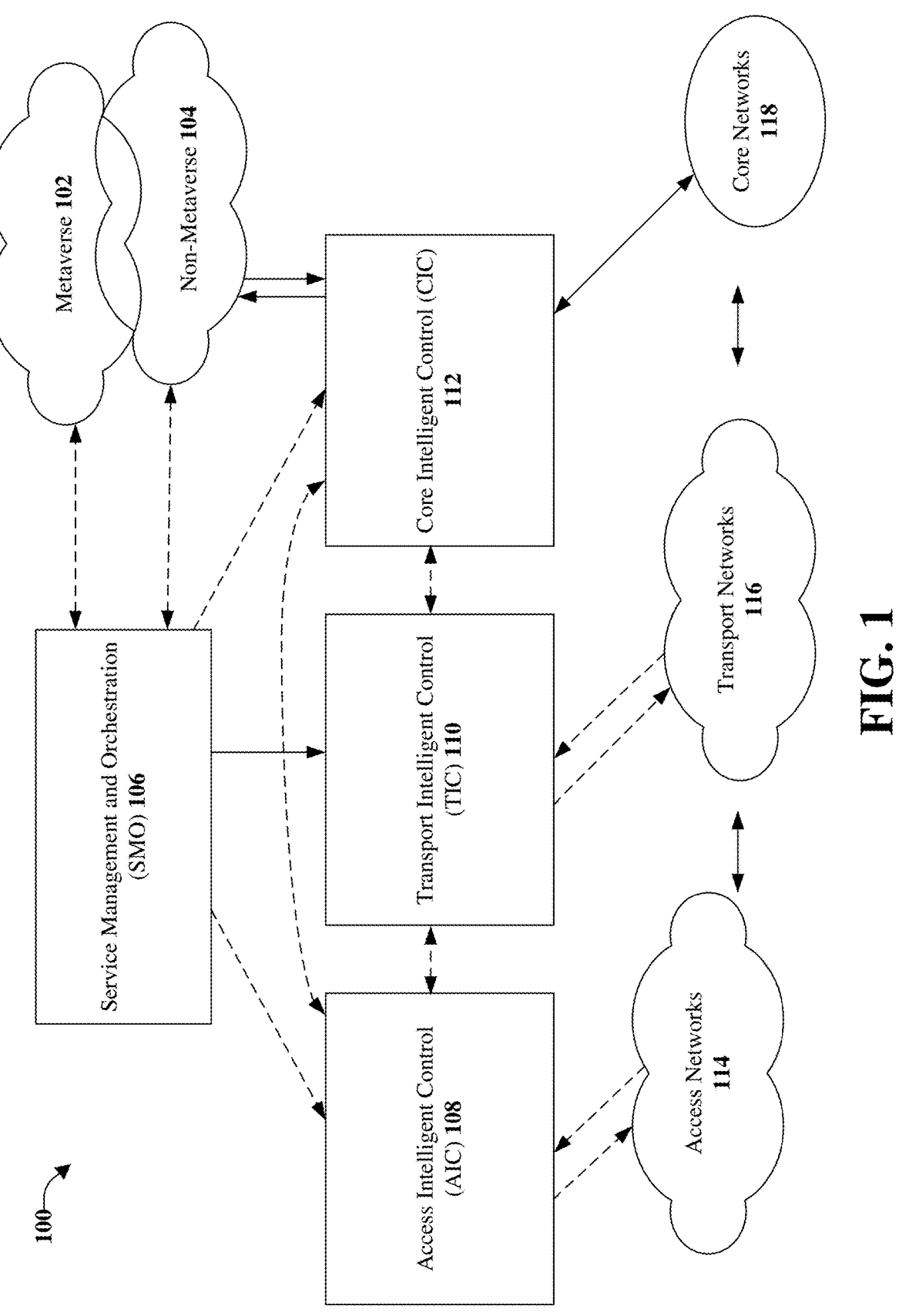
FIG. 1 illustrates an example, non-limiting, system that facilitates network slicing information preservation in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate network slicing configuration information preservation. The network slicing configuration information preservation can be utilized with an open ecosystem, which can be a group of interconnected communication and/or computing resources that function together as a unit. Further, the network slicing configuration information preservation can facilitate performance optimization for end-to-end slicing in advanced networks (e.g., 5G, 6G, and so on). Various advanced networks (e.g., 5G, 6G, and so on), might use higher frequency radios with higher bandwidth as compared to other communication technologies (e.g., 3G, 4G, and so on). While the higher frequencies might have smaller coverage, the higher bandwidth might be desirable for high throughput services.

In addition, 5G Standalone (5G SA) networks, 6G networks, and other advanced networks can be expected to provide better services and richer sets of features than their previous generations (e.g., 3G networks, 4G networks), such as slicing (not available in Long Term Evolution (LTE) networks), enhanced location accuracy, and so on.

As the wireless technologies are expected to keep evolving from one generation to the next and the transition period of generations (e.g., LTE to 5G, 5G to 6G, and so forth) will take a few years, optimizing the use of the technologies and the co-existing (e.g., LTE and 5G SA verses Non-Stand Alone (NSA)) can facilitate the success of the 5G, 6G, and other advanced networks. In this regard for the avoidance of doubt, any embodiments described herein in the context of optimizing communications are not so limited and should be considered also to cover any techniques that implement underlying aspects or parts of the described aspects to improve or increase communication, even if resulting in a sub-optimal variant obtained by relaxing aspects or parts of a given implementation or embodiment.

For example, there are two modes for 5G deployment: NSA (Non Standalone) and SA (Standalone). NSA is for initial 5G deployment where the 5G data will use new 5G data carriers, while the control-plane remains on the mature LTE network. As 5G carrier coverage increases, both control and data will use 5G carriers, which is referred to as the SA deployment (or simply SA).

In the initial 5G deployment, the 5G network can be launched in NSA mode where the voice stays on LTE (VoLTE). When the 5G network starts migrating to SA mode, it is expected that for voice service, VoLTE Evolved Packet System (EPS) fall back (e.g., return) will be used as a transition, until the network has enough good SA NR coverage to support VoNR (Voice over New Radio). This can be similar to the early days of LTE deployment, Circuit Switched FallBack (CSFB) to 3G voice was used as a transition until LTE coverage was determined to be good enough to support VoLTE.

When the 5G voice falls back to EPS, the 5G data also falls back to 5G NSA mode or falls back to LTE only when there is no 5G NSA coverage. Network slicing is a 5G concept. When the UE leaves the 5G coverage, the network slicing information is lost (e.g., is not preserved). For example, a User Equipment (UE) is using the 5G coverage and, since 5G coverage might not be available in certain portions of a communication network, the UE leaves the 5G coverage (e.g., goes to LTE coverage). When the UE returns to the 5G coverage, the slicing information for the UE has to be reestablished since there was no network slicing preservation.

A focus for the NSA and the SA architectures is how to preserve the end user experience provided by network slicing. For example, a solution for policy-based RAN slicing preservation for performance optimization for slice services in NSA and SA architecture in the RAN domain has been proposed. As mentioned, network slicing is a 5G feature (but not in LTE) to support different types of services. When a User Equipment (UE) moves out of the 5G coverage, it will lose the slicing support. Therefore, the UE will have to reestablish the slicing capabilities and configurations after returning to 5G.

As discussed herein, provided is an open end-to-end (E2E) network architecture to support E2E network slicing across service and network domains. Extended access network resources can include wireless, wireline, and satellite using universal resource ports. Further, network slicing preservation in the mobility cores between EPS (LTE core for the NSA) and 5GC (the 5G Core for the SA), and wireline network, using slicing information forwarding is provided herein. Further, as will be discussed in further detail below, the network slicing preservation is extended to the E2E utilizing service driven coordinated network intelligent controllers across the access, transport, core, end device, and services for the UEs moving in and out of the 5G areas in the NSA and SA architecture.

The E2E slicing optimization can be applied in the metaverse domain. Metaverse is a digital world for the next generation of the internet. There might be thousands of services in metaverse. Newer generations of the wireless network can support more and richer sets of metaverse services than the earlier generations. It is also likely that, for a given service, more advanced networks may offer a better user experience. The disclosed embodiments can also be used for future generation of the wireless (e.g., from 5G networks to 6G networks).

As discussed herein, provided is a generic framework that can be used in advance networks and in which network slicing information is preserved. For example, the network slicing information can be packetized and conveyed with handover information from network equipment to network equipment. In another example, the network slicing information can be retained at centralized network equipment (e.g., in an access intelligent controller) and conveyed as a messaging service, referred to as voice over wireless.

Advantages and benefits of the disclosed embodiments include, but are not limited to, using conditional fast return for voice services in NSA and SA architectures based on various factors including, but not limited to, connectivities and coverage, as well as policy rules, and/or charging rules. Further, the disclosed embodiments use 5G SA (as compared to NSA and/or LTE) optimization as an example. Thus, the disclosed embodiments provide a dynamic slicing mapping solution to preserve user experience. Further, by using centralized network equipment, the disclosed embodiments can also reduce and/or mitigate overhead in the communications network. The disclosed embodiments can also be used for future generation of the wireless, as well as in the metaverse environments, where the user priority (e.g., latency, jitter, speed) is stored and forwarded when the UE leaves a certain area and/or a certain access network, then resume immediately (or as soon as possible) when the UE is back to the area and/or switches back to the previous access network.

According to an embodiment, a method can include generating, by a system comprising a processor, network slices for a user equipment based on a service being executed at the user equipment. Generating the network slices can include employing a first microservice at a first network intelligent controller and a second microservice at a second network intelligent controller. The method can also include, based on a first determination that the user equipment is to be handed over from first network equipment to second network equipment, facilitating, by the system, a first transmission that comprises first information indicative of a first handover from the first network equipment to the second network equipment and second information indicative of a network slicing configuration established for the user equipment prior to the first handover. Further, the method can include, based on a second determination that the user equipment is to be handed over from the second network equipment to third network equipment, facilitating, by the system, a second transmission that comprises third information indicative of a second handover from the second network equipment to the third network equipment and the second information indicative of the network slicing configuration established for the user equipment prior to the first handover. In some implementations, the first transmission and the second transmission are facilitated via the first network intelligent controller and the second network intelligent controller.

According to some implementations, the method can include retaining, by the system, the second information indicative of the network slicing configuration using a voice over wireless protocol. Further to these implementations, the method can include forwarding, by the system, the second information indicative of the network slicing configuration to the second network equipment using the voice over wireless protocol.

In some implementations, the first network equipment and the third network equipment are configured to operate according to a first network communication protocol, and the second network equipment is configured to operate according to a second network communication protocol different than the first network communication protocol. Further to these implementations, the first network communication protocol is a new radio network communication protocol, and the second network communication protocol is a long term evolution network protocol.

Another embodiment relates to first network equipment that includes a processor and a memory that stores executable instructions that, when executed by the processor, facilitate performance of operations. The operations can include receiving, from second network equipment, network slice configuration information for a user device during a first handover of the user device from the second network equipment to the first network equipment. The network slice configuration information can include information indicative of a first network slice and a second network slice generated via a microservice of a network intelligent controller. Further the operations can include transmitting, to third network equipment, the network slice configuration information for the user device during a second handover of the user device from the first network equipment to the third network equipment.

In an implementation, the network slice configuration information can include a voice over new radio configuration and information indicative of new radio services assigned to the user device. The operations can include, prior to the transmitting, retaining the network slice configuration information as user device context information representing a context applicable to the user device according to some implementations. The transmitting can include transmitting the network slice configuration information via a voice over wireless message, according to some implementations.

In an example, the user device is an Internet of Things device, and the first network equipment comprises a radio access network intelligent controller. According to another example, the second network equipment and the third network equipment are configured to operate according to a new radio network communication protocol. In another example, the second network equipment is configured to operate according to at least a fifth generation network communication protocol, and the third network equipment is configured to operate according to a long term evolution network protocol. Further, in some implementations, the first network equipment is deployed in a non-standalone deployment architecture, and the second network equipment and the third network equipment are deployed in a standalone deployment architecture.

A further embodiment relates to a non-transitory machine-readable medium, comprising executable instructions that, when executed by a processor of first network equipment, facilitate performance of operations. The operations can include receiving, from second network equipment, first transfer information applicable to a mobile device being transferred according to a first transfer from being serviced via the second network equipment to being serviced via the first network equipment and network slice configuration information assigned to the mobile device. Receiving the first transfer information and receiving the network slice configuration information being at substantially a same time or the same time. The operations can also include retaining the network slice configuration information in a data store and, based on an indication of a second transfer of the mobile device to being serviced via third network equipment, sending, to the third network equipment, second transfer information applicable to the mobile device being transferred according to the second transfer from being serviced via the first network equipment to being serviced via the third network equipment and the network slice configuration information assigned to the mobile device.

In an example, retaining the network slice configuration information can include storing the network slice configuration information as a voice over wireless message, and sending the second transfer information can include sending the voice over wireless message to the third network equipment. In an example, the second network equipment is configured to operate in a standalone new radio network deployment architecture. In some implementations, the sending can include implementing a conditional fast return after voice fall back.

The various embodiments provided herein leverage an open end-to-end (E2E) network architecture to support E2E network slicing across service and network domains. The disclosed embodiments extend network slicing preservation to the E2E utilizing service driven coordinated network intelligent controllers across the access network, transport network, core network, and services for the UEs moving in and out of the 5G areas in the NSA and SA architecture. Extended access network resources include, but are not limited to, wireless, wireline, and satellite using universal resource ports. Network slicing preservation in the mobility cores between EPS (LTE core for the NSA) and 5GC (the 5G core for the SA), and wireline network, using slicing information forwarding are provided herein.

FIG. 1 illustrates an example, non-limiting, system 100 that facilitates network slicing information preservation in accordance with one or more embodiments described herein. Aspects of systems (e.g., the system 100 and the like), equipment, network equipment, user equipment (UE), devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

It is noted that various embodiments are discussed with respect to a fifth generation (5G) network communication protocol, however, the disclosed aspects are not limited to this implementation. Instead, the disclosed embodiments can be implemented in a 5G network communication protocol, a sixth generation (6G) network communication protocol, a New Radio (NR) communication protocol, and/or other advanced communication protocols.

The system 100 can be utilized to provide a user experience in different environments, which can include environments referred to as metaverse 102 and non-metaverse 104. The metaverse 102 is a digital world for the next generation of the internet and includes a universal and immersive virtual world that can be facilitated through the use of virtual reality (VR), augmented reality (AR), and/or other devices that can facilitate an interaction between the "real world" and a "virtual world." The non-metaverse 104 is used herein to refer to a conventional communication experience (e.g., via the internet, mobile communication devices, and/or other equipment).

Included in the system 100 are network equipment, which can include various intelligent controllers, such as a Service Management and Orchestration controller (SMO 106), which is an automation platform for open Radio Access Network (RAN) radio resources. The SMO 106 can communicate with the metaverse 102 and the non-metaverse 104, such as to configure and/or publish information based on service needs for metaverse services and/or non-metaverse services.

Other network equipment (e.g., intelligent controllers) included in the system 100 can be an Access Intelligent Control (AIC 108), a Transport Intelligent Control (TIC 110), and a Core Intelligent Control (CIC 112). From a group of access networks 114, the AIC 108 can select an access network that is determined by the AIC 108 to meet service needs (e.g., different sets of metaverse services) requested by a UE. From a group of transport networks 116, the TIC 110 can select a transport network that is determined by the TIC 110 to be the proper transport instance to meet the service needs. Further, from a group of core networks 118, the CIC 112 can select a core network instance that is determined by the CIC 112 to meet the service needs. According to some implementations, the system 100 includes a Device Intelligent Control (DIC) that can select the proper device instance to meet the service needs.

Figure 2:
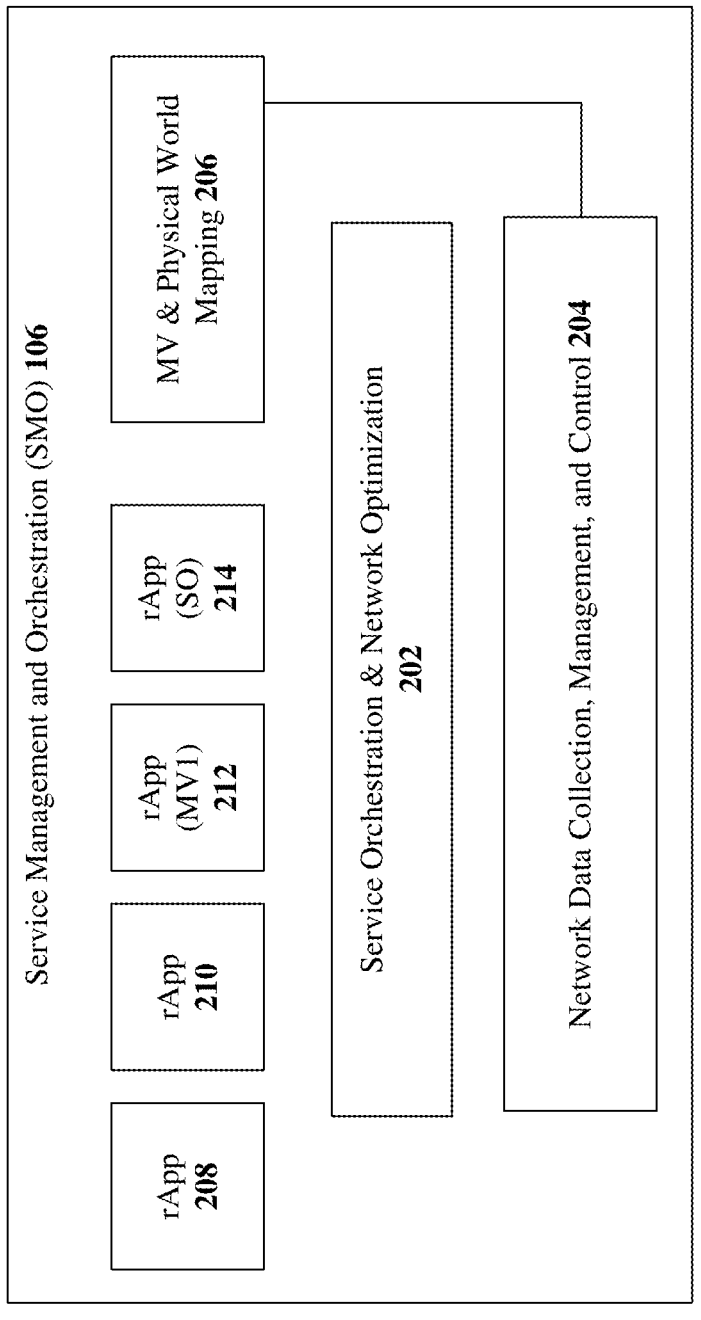
FIG. 2 illustrates an example, non-limiting, service management and orchestration controller in accordance with one or more embodiments described herein.

In further detail, FIG. 2 illustrates an example, non-limiting, service management and orchestration controller (e.g., the SMO 106) in accordance with one or more embodiments described herein. Repetitive description of like elements employed in other embodiments described herein is omitted for sake of brevity.

As mentioned, the SMO 106 can communicate with a metaverse environment (e.g., the metaverse 102) and a non-metaverse environment (e.g., the non-metaverse 104). The communication can be via a control plane and can include details related to configuring and/or publishing information to the respective environment (e.g., the metaverse and/or the non-metaverse). The configuration and/or information published can be based on service needs of one or more UEs as it relates to metaverse services and/or non-metaverse services.

The SMO 106 can facilitate service orchestration and network optimization 202. For example, service orchestration and network optimization 202 can take into consideration needs of one or more UEs as it relates to first services associated with the metaverse environment and second services associated with the non-metaverse environment. In this regard for the avoidance of doubt, any embodiments described herein in the context of optimizing one or more networks and/or related services are not so limited and should be considered also to cover any techniques that implement underlying aspects or parts of the described aspects to improve or increase service orchestration and/or network performance, even if resulting in a sub-optimal variant obtained by relaxing aspects or parts of a given implementation or embodiment.

The SMO 106 can also facilitate one or more controls 204, which can include network data collection, management, and control, as it relates to other network equipment (e.g., the AIC 108, the TIC 110, the CIC 112, the DIC, and so forth), the metaverse 102, and/or the non-metaverse 104. To facilitate the one or more controls 204, one or more mappings 206 can be configured between the metaverse world (e.g., the metaverse 102) and the physical world (e.g., the non-metaverse 104).

Further, included in the SMO 106 are one or more micro-service RAN automation applications (rApps), illustrated as a first rApp 208 and a second rApp 210. The rApps facilitate enablement for deploying, optimizing, and/or healing a network automatically. Further, rApps can be configured to execute on a Non-Real Time RAN Intelligent Controller (RIC). Although two rApps are shown and described, more than two rApps can be included in the SMO 106. Also included in the SMO 106 is at least one rApp for the metaverse 212.

Further, a new micro-service rApp, referred to as Slicing Orchestrator (SO 214) in the SMO 106 can be configured to orchestrate E2E network slices per the service request(s). The SO 214 can provide information indicative of instructions to the AIC 108, the TIC 110, the CIC 112, and the DIC to create the needed slice(s) per service needs (e.g., requests from a UE, service level agreement of the UE, and so on). The SO 214 can compose the resources needed from each world (e.g., the metaverse 102, the non-metaverse 104) to meet the service needs. Further, the SO 214 can provide information indicative of rules and restrictions for the slices. In accordance with various implementations, the SO 214 can interact with the AIC 108, the TIC 110, the CIC 112, and the DIC to create the E2E network slice instance(s) and chain the resources. Additionally, the SO 214 can generate the connections for the requested services depending on one or more locations of metaverse contents and/or non-metaverse contents, the physical location of the users, network resources, and so forth.

Figure 3:
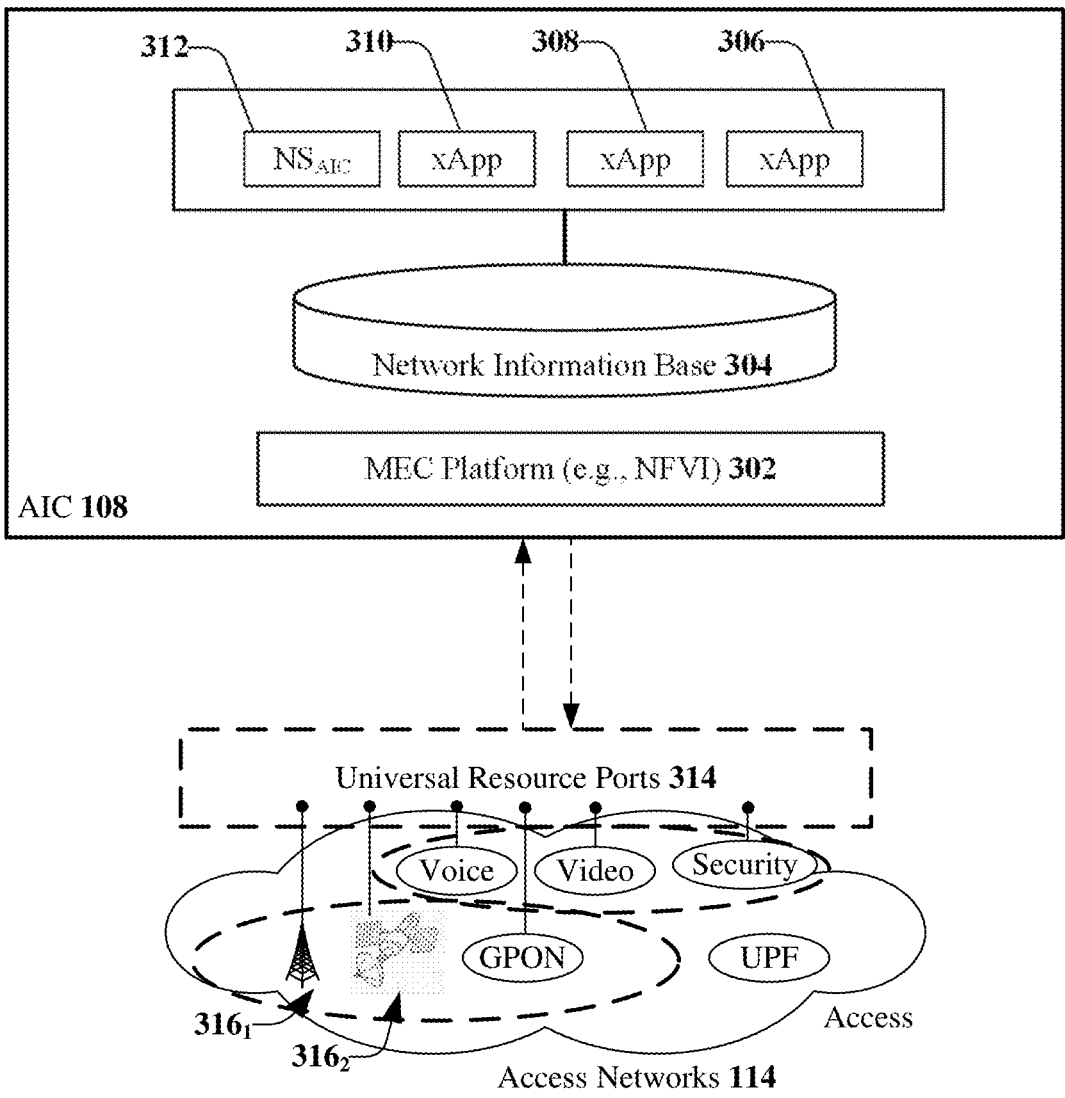
FIG. 3 illustrates an example, non-limiting, access intelligent controller in accordance with one or more embodiments described herein.

FIG. 3 illustrates an example, non-limiting, access intelligent controller (e.g., the AIC 108) in accordance with one or more embodiments described herein. Repetitive description of like elements employed in other embodiments described herein is omitted for sake of brevity.

The AIC 108 is a real-time micro-services framework for access networks. In some implementations, the AIC 108 can be, or can include functionality of, a RAN Intelligent Controller (RIC). A RIC is a software-defined component that is responsible for controlling and/or optimizing RAN functions. It is noted that the term "centralized" does not refer to a location in a network. Instead, "centralized" is utilized herein to denote a similar meaning as common or available to all (e.g., under the control of a central authority).

The AIC 108 can select the proper access network instance to meet the service needs. As illustrated, the AIC 108 can include a Multi-Access Edge Computing (MEC) platform 302 (e.g., Network Functions Virtualization (NFV)). Also included in the AIC 108 is a network information base 304 that interfaces with one or more applications. For example, the one or more applications can be xApps or software that is running a near-real time RIC. The xApps can include a first xApp 306, a second xApp 308, and a third xApp 310. Although three xApps are illustrated and described, in various implementations, the AIC 108 can include any number of xApps.

The AIC 108 can also include a microservice, referred to as $N_{S_{AIC}}$ 312. The $N_{S_{AIC}}$ 312 can be utilized to coordinate with the SO 214 to create slices per the service needs (e.g., different set of metaverse services and/or non-metaverse services). In accordance with some implementations, the AIC 108 can also be used to store or retain the slice information for slice optimization.

In the access networks 114, all the technologies can be viewed and performed as network resources that can be selected to support service delivery. These network resources can be similar to plug-in modules with universal interfaces in the service delivery system (e.g., similar to a Universal Serial Bus (USB). For example, the access technologies can have layer 2 abstractions. These access network resources (e.g., both physical resources and logical resources) are referred to as Universal Resource Ports 314.

In an example, the access network resources can include respective services (e.g., voice, video, security, gigabyte passive optical network (GPON), user plane function (UPF), gNBs, eNBS, and so on). Further, the access network resources can include various physical and/or virtual resources. For example, the access network resources can include network resources (e.g., network equipment $316_1$ and $316_2$) and the virtual resources can include various processing and data resources.

The following describes details of the functionality provided by the AIC 108. It is noted that the following descriptions use LTE and 5G RAN as an example. However, other communication networks and/or communication protocols can be utilized with the disclosed embodiments and LTE and 5G RAN is just one example.

The microservice $N_{S_{AIC}}$ 312 in the AIC 108 coordinates with the SO 214 to create slices per the service needs (e.g., different sets of services). When the UE moves out of the coverage of gNB and IRAT and into the coverage of an eNB, the gNB sends the 5G slice configuration information to the eNB, which can store (e.g., retain) the information (e.g., in memory, in a data store, in a data structure, and so on).

The 5G slice configuration information can include information related to VoNR and/or other 5G services. The eNB can retain the SA slicing configuration as UE context information and can forward the information from the source eNB to the target eNB. For example, when the UE is handed off from a first eNB to a second eNB, the first eNB can forward the information to the second eNB.

The stored slice configuration information info at the eNB (e.g., the first eNB, the second eNB, a subsequent eNB, and so on) can be sent back from eNB to the gNB when the UE is handed over to the gNB. For example, the UE can move from a first gNB to a first eNB, then a second eNB, then to a second gNB (or the original or first gNB). Accordingly, the UE can quickly resume the same application and/or session (by default) after returning from EPS voice fallback. In is noted that the disclosed embodiments utilize conditional fast return for voice service in NSA and SA architecture based on various factors. Such factors include, but are not limited to, available connectivities and coverage of gNBs, as well as policy rules, charging rules, and so on.

Alternatively, or additionally, the gNB sends the 5G slice configuration (including VoNR information and/or other 5G services information) to the $N_{S_{AIC}}$ 312. The $N_{S_{AIC}}$ 312, or a database in the AIC 108, can maintain the slice state information for the UE. Meanwhile, the UE can move out of the 5G coverage to one or more eNBs. Upon or after the UE returns to 5G coverage, which can be a new or the previous gNB, the $N_{S_{AIC}}$ 312 sends to the gNB the stored slice configuration information. In such a manner, the UE can quickly resume the same application and/or session (by default) after returning (e.g., being handed off) from one or more eNBs. It is noted that the disclosed embodiments use conditional fast return for voice service in NSA and SA architectures based on many factors, such as available connectivities and coverage of gNBs, policy rules, charging rules, and so on. Further, the disclosed embodiments can be extended to include any wireless, satellite, and/or wireline technologies.

Figure 4:
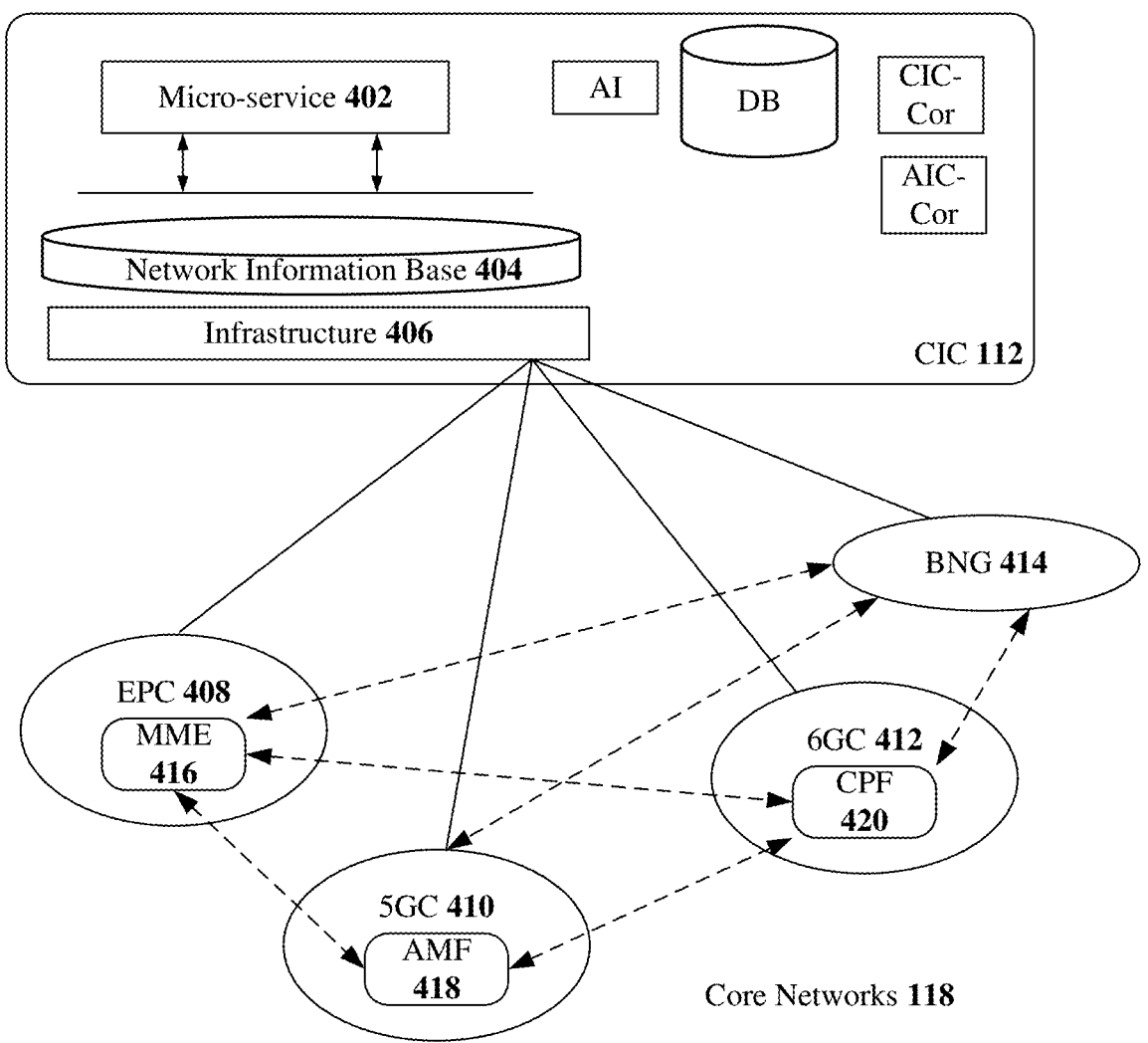
FIG. 4 illustrates an example, non-limiting, core intelligent controller in accordance with one or more embodiments described herein.

FIG. 4 illustrates an example, non-limiting, core intelligent controller (e.g., the CIC 112) in accordance with one or more embodiments described herein. Repetitive description of like elements employed in other embodiments described herein is omitted for sake of brevity. The CIC 112 is a real-time micro-services framework coupled with operator intent policy and control logics for core network optimization and flexibility and improve network efficiency and QoE.

The CIC 112 can select the appropriate core instance to meet the service needs. A microservice, referred to as $N_{S_{core}}$ 402 in the CIC 112 can coordinate with the SO 214 to create slices per the service needs (e.g., different set of metaverse services such as slice M1, slice M2, and so on). In accordance with some implementations, the CIC 112 also be used to store the slice information for slice optimization.

The CIC 112 can include a network information base 404 and infrastructure information 406 related to the core networks 118. The core networks 118 include, but are not limited to, an Evolved Packet Core (EPC) network 408, a 5G Core (5GC) 410, a 6G Core (6GC) 412, and at least one Broadband Network Gateway (BNG) 414. As illustrated the EPC network 408 can include a Mobility Management Entity (MME) 416. The 5GC 410 can include a 5G Core Access and Mobility Management Function (AMF) 418. The 6GC 412 can include a Control Plane Function (CPF) 420.

Upon or after the UE moves out of the 5G coverage, it results in a change of the serving core (e.g., from 5GC to EPC in the case of SA to NSA), the slice information is preserved as discussed herein. Upon or after the UE later moves back to the 5G coverage, it results in another change of the core (e.g., from EPC to 5GC). Accordingly, an enhancement of the N26 (between EPC network 408 MME 416 and 5GC 410 AMF 418) to carry the slice information for the UE can be facilitated. Alternatively, the UE network slice information can be stored at the CIC 112 and forwarded (e.g., transmitted via one or more signals) to the proper core network based on the UE moving between NSA and SA networks.

According to some implementations, the network slicing support preservation in the core network can be extended to include mobility cores between EPS (LTE core for the NSA) and 5GC (the 5G core for the SA), and wireline network.

Figure 5:
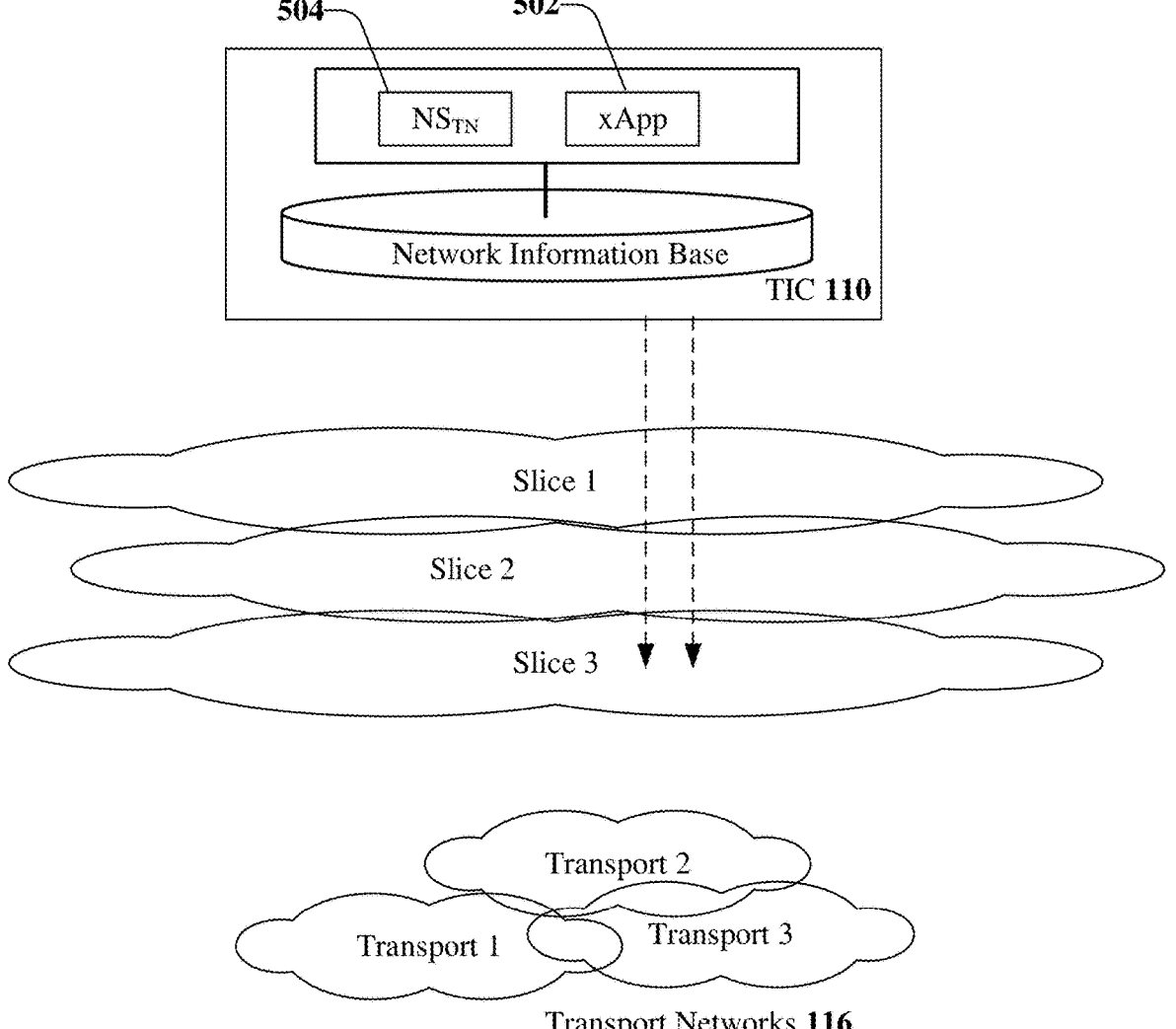
FIG. 5 illustrates an example, non-limiting, transport intelligent controller in accordance with one or more embodiments described herein.

FIG. 5 illustrates an example, non-limiting, transport intelligent controller (e.g., the TIC 110) in accordance with one or more embodiments described herein. Repetitive description of like elements employed in other embodiments described herein is omitted for sake of brevity.

The TIC 110 is a real-time micro-services framework for the transport network. The TIC 110 can select the proper transport instance to meet the service needs. The TIC 110 can include one or more xApps 502. The TIC 110 also includes a microservice $N_{S_{TN}}$ 504. The TIC 110 can be utilized to coordinate with the SO 214 to create slices per the service needs (e.g., different sets of metaverse services and/or non-metaverse services). For example, one or more slices can be created, illustrated as a first slice (slice 1), a second slice (slice 2), and a third slice (slice 3).

In accordance with some implementations, the TIC 110 can also be used to store the slice information for slice optimization. For example, the TIC 110 is a real-time micro-services framework for the transport networks 116. Illustrated are a first transport network (transport 1), a second transport network (transport 2), and a third transport network (transport 3), although there can be more than three transport networks. The TIC 110 selects the proper transport instance (e.g., the transport 1, the transport 2, the transport 3, and so on) to meet the service needs.

Similar to the CIC 112 as discussed with respect to FIG. 4, the slice preservation can also be implemented via storing the slice information then forwarding the slice information to the proper transport network, or via underline interaction for slice optimization.

As discussed herein, a DIC (Device Intelligent Controller) can be utilized and can be configured to select the proper device instance to meet the service needs. A microservice NsDIC in the DIC can coordinate with the SO 214 to create slices per the service needs (e.g., different set of metaverse services and/or non-metaverse services). The DIC can also be utilized to store the slice information for slice optimization.

Figure 6:
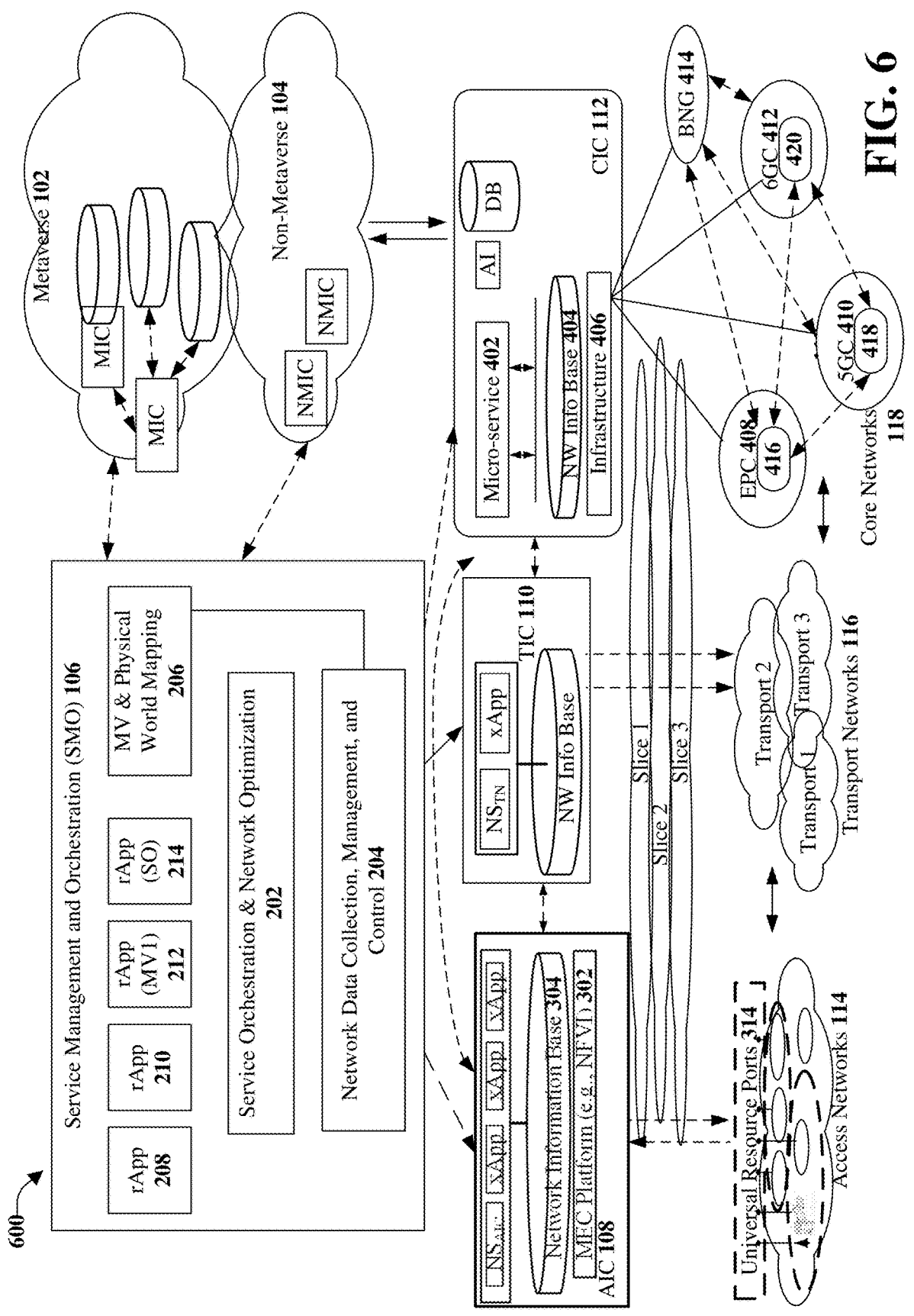
FIG. 6 illustrates an example, non-limiting, complete end-to-end open network architecture in accordance with one or more embodiments described herein.

FIG. 6 illustrates an example, non-limiting, architecture 600 in accordance with one or more embodiments described herein. Repetitive description of like elements employed in other embodiments described herein is omitted for sake of brevity. The architecture 600 can be a complete end-to-end open network architecture that can comprise one or more of the components and/or functionality of the system 100, the SMO 106, the AIC 108, the TIC 110, the CIC 112, the DIC, and vice versa. The various embodiments provided herein enable E2E performance optimization for slicing services (e.g., in NSA and SA architectures) based on various factors. Such factors can include, but are not limited to, available connectivity, available coverage, policy rules, charging rules, and so on.

In FIG. 6, the dashed lines indicate signaling via the control plane and solid lines indicate signaling via the user plane. As illustrated, the metaverse 102 can include one or more metaverse intelligent controller (MIC) and the non-metaverse 104 can include one or more non-metaverse intelligent controllers (NMIC). The metaverse 102 also include one or more data store that comprise information indicative of metaverse resource inventory.

In accordance with an example use case, the UE can be under the coverage of a gNB. Thereafter, the UE moves out of the coverage of gNB and IRAT and into coverage of an eNB. It is noted that the UE could perform some mobility handovers across several eNBs. Thereafter, the UE moves back to the gNB coverage. The slicing information of the UE from when it was initially in the coverage of the gNB to when it returns to coverage of a gNB (which could be the same or a different gNB) is preserved as discussed herein.

Advantages and benefits of the disclosed embodiments include, but are not limited to, leveraging a new open E2E network architecture to support E2E network slicing across service and network domains. Further, provided herein is extended access network resources to include wireless, wireline, and satellite using universal resource ports. Network slicing preservation in the mobility cores between EPS (LTE core for the NSA) and 5GC (the 5G core for the SA), and wireline network, using slicing information forwarding are also provided herein. Additionally, or alternatively, the embodiments discussed herein extend the network slicing preservation to the E2E utilizing service driven coordinated network intelligent controllers across the access, transport, core, and services for the UEs moving in and out of the 5G areas in the NSA and SA architecture.

Figure 7:
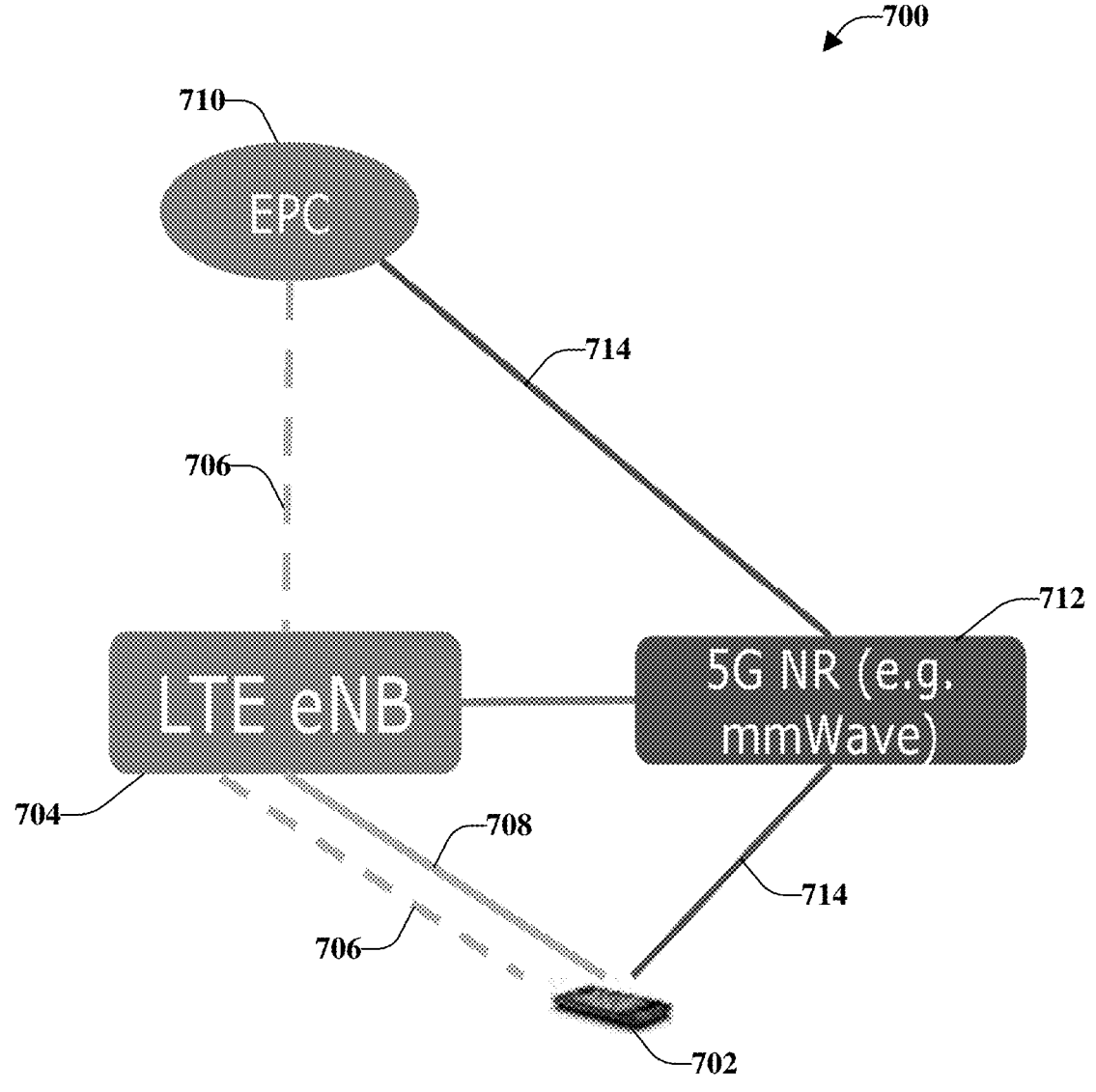
FIG. 7 illustrates an example, non-limiting, representation of a system for a non-stand-alone mode for advanced communications networks in accordance with one or more embodiments described herein.

FIG. 7 illustrates an example, non-limiting, representation of a system 700 for a non-stand-alone (NSA) mode for advanced communications networks in accordance with one or more embodiments described herein. Repetitive description of like elements employed in other embodiments described herein is omitted for sake of brevity. The system 700 can comprise one or more of the components and/or functionality of the system 100, the SMO 106, the AIC 108, the TIC 110, the CIC 112, the DIC, the architecture 600, and vice versa The illustrated NSA mode (e.g., the system 700) comprises a UE 702 that connects to first network equipment (e.g., LTE eNB equipment 704) via an LTE C-plane 706 and an LTE U-plane 708. The LTE eNB equipment 704 communicates to an EPC 710 via the LTE C-Plane 706. In addition, the UE 702 connects to second network equipment (e.g., 5G NR equipment 712) via a 5G U-plane 714. The 5G NR equipment 712 communicates with the EPC 710 via the 5G U-plane 714.

In the system 700, the 5G NSA leverages LTE for better coverage and reliability. The 5G mmWave NR (e.g., the 5G NR equipment 712) can be utilized for high speed. Further, a 5G midband can be utilized for high speed and relatively good coverage. In another example, a 5G low band NR can provide good coverage, throughput, and reliability. However, 5G new services, such as slicing, might require the UE 702 to operate in a 5G SA mode.

Figure 8:
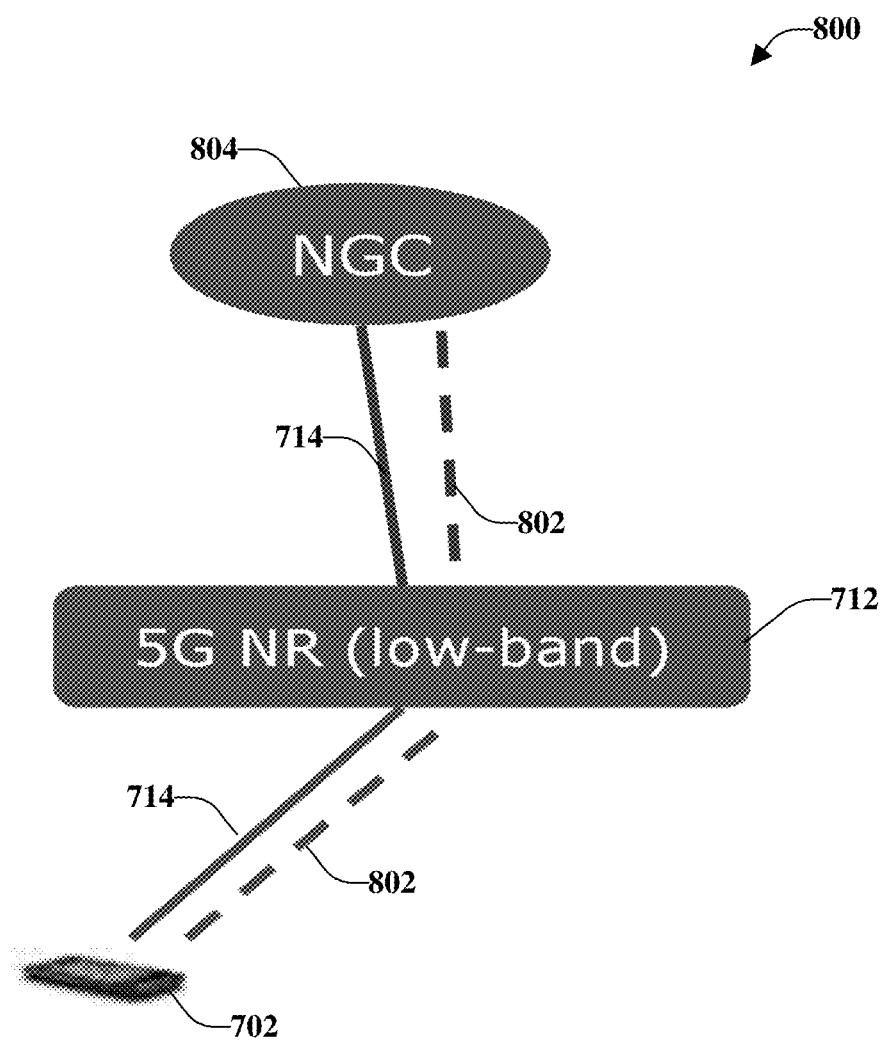
FIG. 8 illustrates an example, non-limiting, representation of a system for a stand-alone mode for advanced communications networks in accordance with one or more embodiments described herein.

FIG. 8 illustrates an example, non-limiting, representation of a system 800 for a stand-alone (SA) mode for advanced communications networks in accordance with one or more embodiments described herein. Repetitive description of like elements employed in other embodiments described herein is omitted for sake of brevity. The system 800 can comprise one or more of the components and/or functionality of the system 100, the SMO 106, the AIC 108, the TIC 110, the CIC 112, the DIC, the architecture 600, and vice versa.

The system 800 comprises the UE 702 that communicates to the 5G NR equipment 712 via the 5G U-plane 714 and a 5G C-plane 802. The 5G NR equipment 712 communicates with a Next Generation Core (NGC) 804 via the 5G U-plane 714 and the 5G C-plane 802. The 5G SA (or future 6G) might provide better services and a richer set of features than their previous generations. These services include, but are not limited to, slicing, VoNR (Voice over NR), enhanced location accuracy, and so on.

In the system 800, there can be voice fall back to EPS. In the NSA mode, upon or after the voice call completes, the LTE eNB equipment 704 immediately (or as quickly as possible) triggers a "Radio Resource Control (RRC) Release and Redirect" or an "IRAT Handover" to 5G SA mode. The LTE eNB equipment 704 does not wait for the data leg to become idle per 3GPP procedure. Upon or after a Release and Redirect or handover completes, the data transmission will continue. Accordingly, there can be a fast return to 5G SA. The fast return procedure can be an "RRC release and redirect" or an "IRAT handover."

The spectrum is always a sparse resource. The future generations of radio technologies will most likely use higher frequencies with higher bandwidth. While the higher frequency will have smaller coverage, the higher bandwidth will be desirable for the high throughput services.

As the radio technologies will keep evolving from one generation to the next and the transition period of generations (e.g., LTE to 5G, and 5G to 6G, and other advanced networks in the future) will take many years, optimizing the use of the technologies and the co-existing (e.g., LTE and 5G SA versus NSA) is important to the success of the 5G, 6G and beyond.

For the voice support, the conventional state is that the voice fallback via redirection to establish a VoLTE call (e.g., there is no interaction with any 5G element). However, even though end users may be provided with a voice communication service using VoLTE when VoNR is not supported, but there is no coordination between LTE and 5G and when VoNR becomes available later, the previously configuration of VoNR (e.g., slicing), has to be reestablished which will cause longer delay and extra communication. To overcome this as well as other challenges, the disclosed embodiments use a policy based conditional fast return and performance optimization for slicing services in NSA and SA architectures based on many factors such as available connectivities and coverage, as well as policy/charging rules. Further, the disclosed embodiments use dynamic mapping (e.g., slicing preservation) via the communication between gNB and eNB and the memory and store the previous 5G configuration for the VoNR.

FIG. 9 illustrates an example, non-limiting, computer-implemented method 900 for facilitating conditional fast return with slicing configuration information preservation in accordance with one or more embodiments described herein. Repetitive description of like elements employed in other embodiments described herein is omitted for sake of brevity. The computer-implemented method 900 can be implemented by a system including a memory and a processor, user equipment including memory and a processor, network equipment including a memory and a processor, a network controller including a memory and a processor, or another computer-implemented device including a memory and a processor.

The computer-implemented method 900 starts at 902 with generating, by a system comprising a processor, network slices for a user equipment based on a service being executed at the user equipment. The generating comprises employing a first microservice at a first network intelligent controller and a second microservice at a second network intelligent controller.

A first determination that a user equipment is to be handed over from first network equipment to second network equipment is made. Based on the handover determination, at 904, a system comprising a processor, facilitates a first transmission that comprises first information indicative of a first handover from the first network equipment to the second network equipment and second information indicative of a network slicing configuration established for the user equipment prior to the first handover.

Further, a second determination that the user equipment is to be handed over from the second network equipment to third network equipment is made. Based on this determination, at 906, the system facilitates a second transmission that comprises third information indicative of a second handover from the second network equipment to the third network equipment and the second information indicative of the network slicing configuration established for the user equipment prior to the first handover.

According to some implementations, the first transmission and the second transmission are facilitated via network intelligent controllers. Further, in some implementations, the method can include retaining, by the system, the second information indicative of the network slicing configuration via a voice over wireless protocol. Additionally, the method can include forwarding, by the system, the second information indicative of the network slicing configuration to the second network equipment via the voice over wireless protocol.

In an example, the first network equipment and the third network equipment are configured to operate according to a first network communication protocol. Further to this example, the second network equipment is configured to operate according to a second network communication protocol different than the first network communication protocol. For example, the first network communication protocol can be a new radio network communication protocol and the second network communication protocol can be a long term evolution network protocol.

According to another example, the first network equipment is configured to operate according to a first network communication protocol and the second network equipment is configured to operate according to a second network communication protocol different than the first network communication protocol. Further to this example, the first network communication protocol is a new radio network communication protocol, and the second network communication protocol is a long term evolution network protocol.

Figure 10:
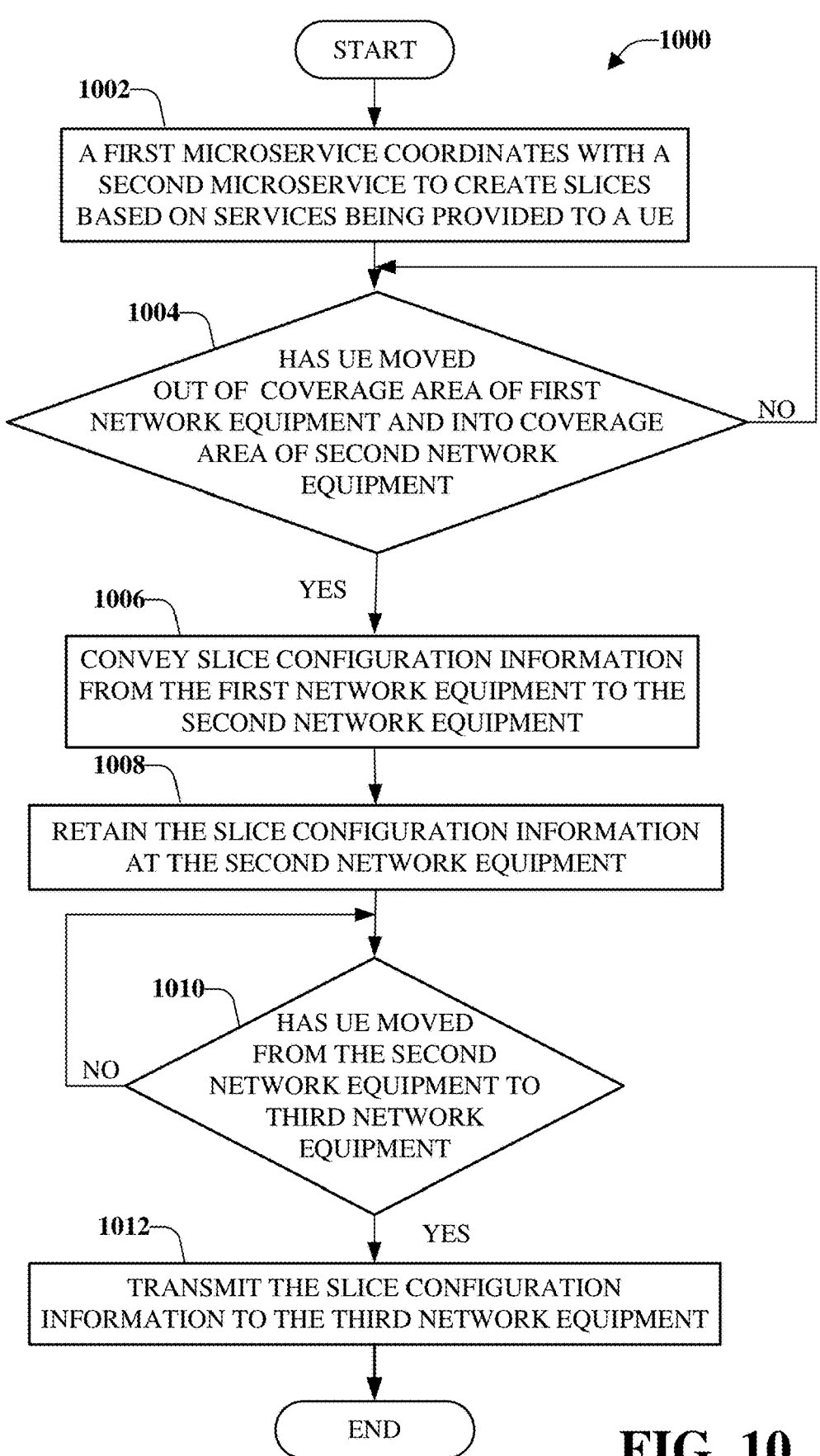
FIG. 10 illustrates another example, non-limiting, computer-implemented method for facilitating conditional fast return with slicing configuration information preservation in accordance with one or more embodiments described herein.

FIG. 10 illustrates another example, non-limiting, computer-implemented method 1000 for facilitating conditional fast return with slicing configuration information preservation in accordance with one or more embodiments described herein. Repetitive description of like elements employed in other embodiments described herein is omitted for sake of brevity. The computer-implemented method 1000 can be implemented by a system including a memory and a processor, user equipment including memory and a processor, network equipment including a memory and a processor, a network controller including a memory and a processor, or another computer-implemented device including a memory and a processor.

At 1002 of the computer-implemented method 1000, a first microservice coordinates with a second microservice to create slices based on services being provided to a UE. The first microservice can be associated with an access intelligent controller (e.g., the AIC 108). For example, the first microservice can be the $N_{S_{AIC}}$ 312. Further, the second microservice can be associated with a Service Management and Orchestration controller (e.g., the SMO 106). For example, the second microservice can be a micro-service rApp, referred to as Slicing Orchestrator (e.g., the SO 214).

At 1004, a determination is made whether the UE has moved out of a coverage area of first network equipment and into a coverage area of second network equipment. The determination can also include a determination that the first network equipment and the second network equipment utilize different communication technologies. For example, the first network equipment can include a gNB and IRAT and the second network equipment can include a gNB. However, the disclosed embodiments are not limited to this example. Instead, the first network equipment can be at least 5G network equipment and the second network equipment can be 4G network equipment. In another example, the first network equipment can be new radio network equipment and the second network equipment can be LTE network equipment.

If the device has not moved out of the coverage area ("NO"), the computer-implemented method 1000 returns to 1004 for another determination (until the UE moves out of the coverage area). If the determination is that the UE has moved out of the coverage area and the network technology is different ("YES"), at 1006, slice configuration information is conveyed from the first network equipment to the second network equipment. For example, 5G slice configuration information, including VoNR and other 5G services can be transmitted from the gNB to the eNB.

As indicated at 1008, the second network equipment can retain the slice configuration information. The slice configuration information can be retained as UE context information representing a context applicable to the user device. For example, the slice configuration information can be retained in one or more data stores of the second network equipment. In another example, the slice configuration information can be stored in one or more data structures of the second network equipment. In yet another example, the slice configuration information can be retained in one or more memories of the second network equipment.

Further, at 1010, a second determination is made whether the UE is moving from the second network equipment (also referred to as previous network equipment) to third network equipment (or subsequent network equipment). For example, the second network equipment can be a source eNB and the third network equipment can be a target eNB. If the second determination is that the UE has not moved ("NO"), the computer-implemented method 1000 returns to 1010 until the UE moves.

If the determination at 1010 is that the UE has moved ("YES"), the UE context information can be conveyed from the second network equipment to the third network equipment at 1012. For example, the UE context information can be forwarded from a source eNB to a target eNB. In another example, the stored slice configuration information at the eNB can be sent from the eNB to a gNB (which can be the same gNB associated with the first network equipment or another gNB associated with other network equipment). Accordingly, the UE can resume the same application and/or the same session (e.g., by default) after return from EPS voice fall back.

Alternatively, or additionally, the gNB sends the 5G slice configuration including VoNR and other 5G services to the NsAIC. The NsAIC or a database in the AIC maintains the slice state information for the UE. Meanwhile, the UE may move out of the 5G coverage to eNBs. Upon or after the UE returns to 5G coverage, which can be a new or the previous gNB, NsAIC sends gNB the stored slice configuration information and the UE can quickly resume the same application/session (by default) after return from the eNBs.

Figure 11:
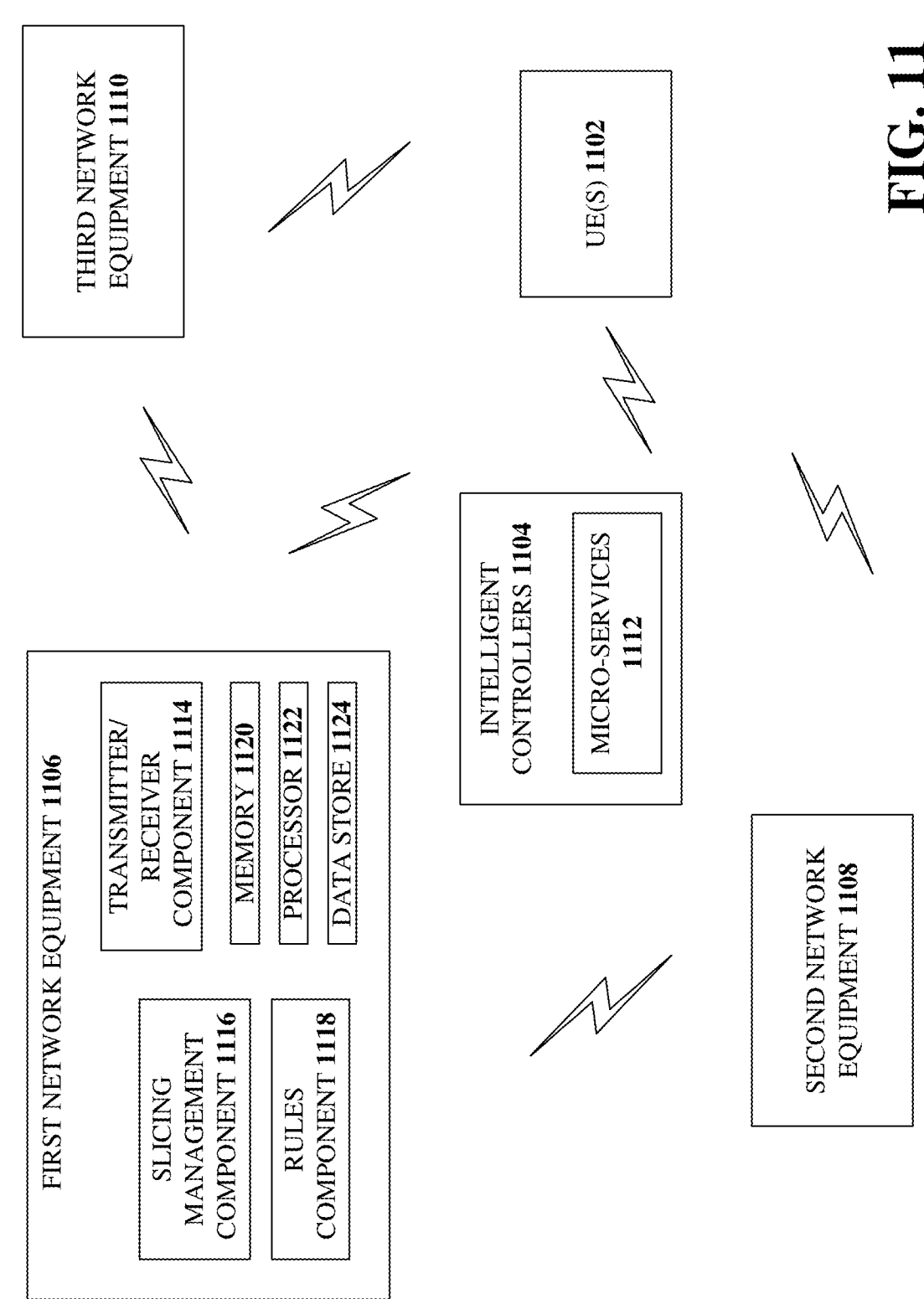
FIG. 11 illustrates an example, non-limiting, system that facilitates network slice configuration information preservation during fast return after voice fallback in accordance with one or more embodiments described herein.

FIG. 11 illustrates an example, non-limiting, system 1100 that facilitates network slice configuration information preservation during fast return after voice fallback in accordance with one or more embodiments described herein. The system 1100 can comprise one or more of the components and/or functionality of the system 100, the SMO 106, the AIC 108, the TIC 110, the CIC 112, the DIC, the architecture 600, and vice versa.

It is noted that various embodiments are discussed with respect to a fifth generation network communication protocol (e.g., 5G), however, the disclosed aspects are not limited to this implementation. Instead, the disclosed embodiments can be implemented in a 5G network communication protocol, a sixth generation (6G) network communication protocol, a New Radio (NR) communication protocol, and/or other advanced communication protocols.

Aspects of systems (e.g., the system 1100 and the like), equipment, UE (UE), network equipment, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

The system 1100 can include a UE 1102, one or more intelligent controllers 1104, first network equipment 1106, second network equipment 1108, and third network equipment 1110. It is noted that although only one UE and three network equipment are illustrated and described for purposes of simplicity, the system can include more than one UE and/or fewer or more than three network equipment.

In various embodiments, the UE 1102, the one or more intelligent controllers 1104, and/or network equipment (e.g., the first network equipment 1106, the second network equipment 1108, the third network equipment 1110) can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the UE 1102, the one or more intelligent controllers 1104, and/or network equipment can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated, the one or more intelligent controllers 1104 can include one or more microservices 1112. For example, the one or more intelligent controllers 1104 can be a service management and orchestration (e.g., the SMO 106), an access intelligent control (e.g., the AIC 108), a transport intelligence control (e.g., the TIC 110), a core intelligent control (e.g., the CIC 112), and/or a device intelligent control (e.g., a DIC). Further to this example, the one or more microservices 1112 can include a Slicing Orchestrator (e.g., the SO 214), a microservice $N_{S_{AIC}}$ (e.g., the $N_{S_{AIC}}$ 312), a microservice $N_{S_{core}}$ (e.g., the $N_{S_{core}}$ 402), a microservice $N_{S_{TN}}$ (e.g., microservice $N_{S_{TN}}$ 504), and so on.

The network intelligent controllers of the one or more intelligent controllers 1104 are configured to coordinate with one another to create network slices for the UE 1102. The creation of the network slices can be based on one or more applications executing at the UE 1102. Information related to the network slice configuration can be retained as network slice information. According to some implementations, respective intelligent controllers of the one or more intelligent controllers 1104 can be included in respective network equipment.

The first network equipment 1106 can include a transmitter/receiver component 1114, a slicing management component 1116, a rules component 1118, at least one memory 1120, at least one processor 1122, and at least one data store 1124. It is noted that although discussed with respect to the first network equipment 1106, the various components discussed herein can also be included in other network equipment (e.g., the second network equipment 1108, the third network equipment 1110, and so on).

The transmitter/receiver component 1114 can receive from the second network equipment 1108 a connection request that comprises an indication of a fall back procedure. According to some implementations, the connection request can be an indication of a handover of the UE from the second network equipment 1108 to the first network equipment 1106. At substantially the same time as the connection request (or handover information) is received from the second network equipment 1108, information related to network slicing information assigned to the UE can also be received. For example, the connection request (or handover) can include first transfer information applicable to a UE being transferred from being serviced via the second network equipment 1108 to being serviced via the first network equipment 1106 and network slicing information assigned to the UE. According to some implementations, the network slicing information can be retained in the slicing management component 1116, the at least one memory 1120, and/or the at least one data store 1124.

Further, based on an indication of a second transfer of the UE to the third network equipment 1110, the transmitter/receiver component 1114 can transmit second transfer information applicable to the UE being transferred from being serviced via the first network equipment 1106 to being serviced via the third network equipment 1110. Transmitted at substantially the same time as the second transfer information is the network slicing information assigned to the UE.

According to some implementations, to facilitate the transfer to the first network equipment 1106 and/or from the first network equipment 1106, the rules component 1118 can evaluate policy rules and/or charging rules associated with the UE 1102. In some implementations, the rules component 1118 can evaluate connectivities and/or coverage information associated with the UE 1102.

The at least one memory 1120 can be operatively connected to the at least one processor 1122. The at least one memory 1120 and/or the at least one data store 1124 can store executable instructions that, when executed by the at least one processor 1122 can facilitate performance of operations. Further, the at least one processor 1122 can be utilized to execute computer executable components stored in the at least one memory 1120 and/or the at least one data store 1124.

For example, the at least one memory 1120 can store protocols associated with facilitating conditional fast return with slicing information preservation as discussed herein. Further, the at least one memory 1120 can facilitate action to control communication between the system 700, other systems, equipment, network equipment, the UE, and/or other UEs such that the system 700 can employ stored protocols and/or processes to facilitate conditional fast return with network slicing information retention as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 1122 can facilitate conditional fast return with network slicing information preservation as discussed herein. The at least one processor 1122 can be a processor dedicated to analyzing and/or generating information received, a processor that controls one or more components of the system 1100, and/or a processor that both analyzes and generates information received and controls one or more components of the system 1100.

Figure 12:
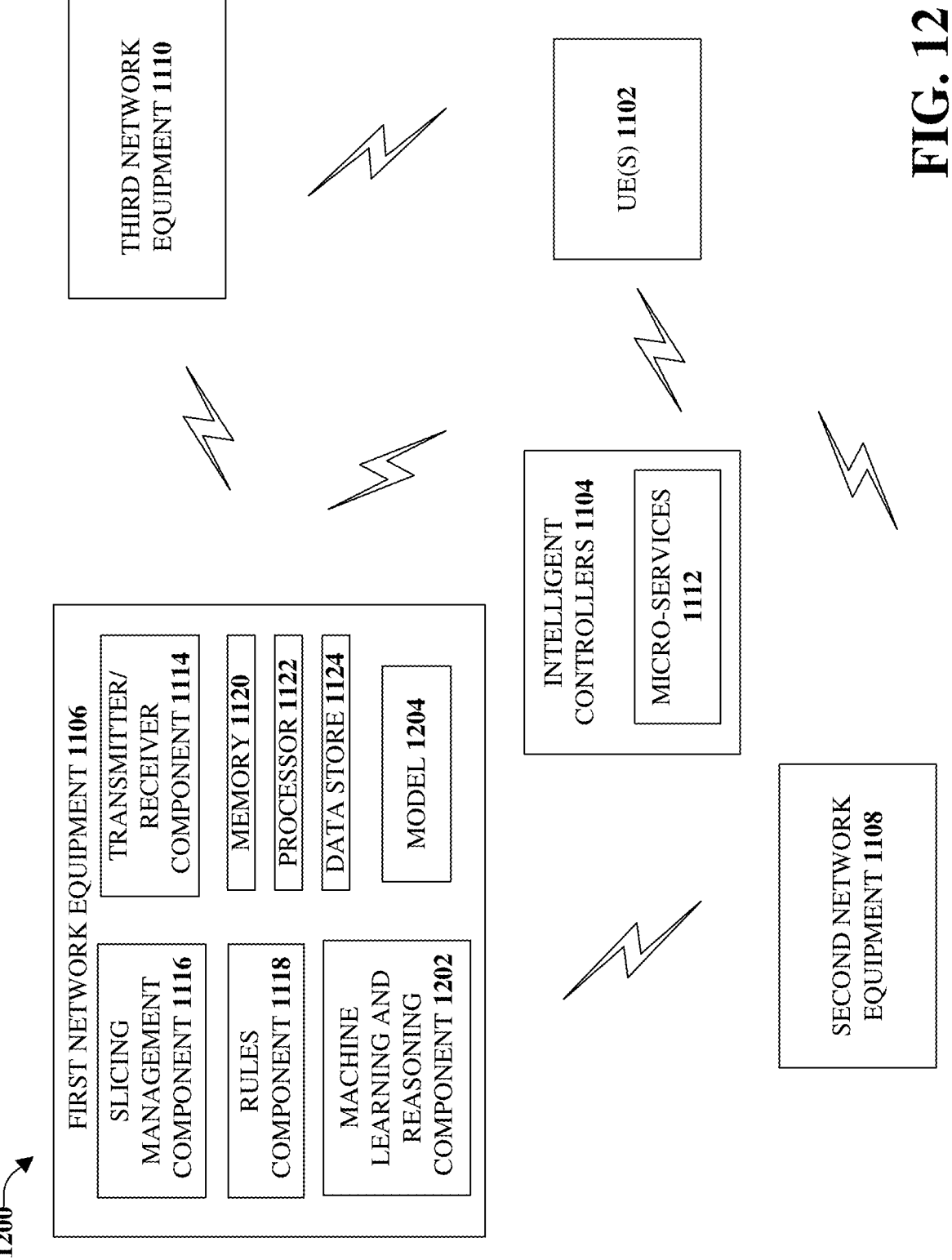
FIG. 12 illustrates an example, non-limiting, system that employs automated learning that trains a model to facilitate one or more of the disclosed aspects in accordance with one or more embodiments described herein.

FIG. 12 illustrates an example, non-limiting, system 1200 that employs automated learning that trains a model to facilitate one or more of the disclosed aspects in accordance with one or more embodiments described herein. Repetitive description of like elements employed in other embodiments described herein is omitted for sake of brevity. The system 800 can comprise one or more of the components and/or functionality of the system 100, the SMO 106, the AIC 108, the TIC 110, the CIC 112, the DIC, the architecture 600, the system 1100, and vice versa.

The system 1200 can utilize machine learning to train a model to identify an opportunity to facilitate a conditional fast return to stand alone advanced networks after voice fall back while maintaining information related to network slicing assigned to a UE. The model can also be trained to facilitate network slicing and network slice configuration preservation via one or more microservices. The model can be trained to a defined confidence level. As illustrated, the system 1200 can comprise a machine learning and reasoning component 1202 that can be utilized to automate one or more of the disclosed aspects based on training a model 1204. The machine learning and reasoning component 1202 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 1202 can employ principles of probabilistic and decision theoretic inference. Additionally, or alternatively, the machine learning and reasoning component 1202 can rely on predictive models (e.g., the model 1204) constructed using automated learning and/or automated learning procedures. Logic-centric inference can also be employed separately or in conjunction with probabilistic methods.

The machine learning and reasoning component 1202 can infer whether information related to assigned network slicing should be conveyed between network equipment during handover, or whether the assigned network slicing should be handled by a coordinator (e.g., a RIC) and/or one or more microservices. Based on this knowledge, the machine learning and reasoning component 1202 can make an inference based on whether it would be better to retain the assigned network slicing information at a coordinator (and reduce and/or mitigate an amount of overhead in a communications network) or whether the information should be transferred from network equipment to network equipment.

As used herein, the term "inference" refers generally to the process of reasoning about or inferring states of a system, a component, a module, an environment, UEs, and/or devices from a set of observations as captured through events, reports, data and/or through other forms of communication. Inference can be employed to identify when and how to redirect a UE among network equipment, which information to include with a handoff or other transfer information, whether to delay a fast return, delaying a fast return based on one or more considerations (e.g., an application executing on a UE in view of capabilities of network equipment, a network congestion level, and so on), when and to which network equipment to redirect the UE, and so on. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with conditional fast return with network slicing information retention in 5G communication networks, 6G communication networks, new radio communication networks, and/or other advanced networks) can employ various artificial intelligence-based schemes for carrying out various aspects thereof. For example, a process for implementing service aware logic and/or network congestion logic to determine one or more service characteristics that are needed (e.g., latency, throughput, delay jitter, packet loss), and so on can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to facilitate a conditional fast return.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing equipment feedback associated with conditional fast return and/or assigned network slicing information by receiving implicit information, based on an inference, and so on. For example, SVMs can be configured through a learning or training phase within a classifier constructor and feature selection module. Thus, a classifier(s) can be used to automatically learn and perform a number of functions, including but not limited to determining, according to a predetermined criterion, when to convey network slicing information, how to convey the network slicing information, when to redirect the UE to other network equipment, and so forth. The criteria can include, but is not limited to, historical information, feedback information, the type of application executing at the UE, measured signal information (e.g., QoS, power levels, and so on), evaluation of Service Level Agreements (SLAs), user preferences, an amount of network congestion experienced by one or more network equipment, and so forth.

Additionally, or alternatively, an implementation scheme (e.g., a rule, a policy, and so on) can be applied to control and/or regulate conditional fast return to stand alone advanced networks after voice fall back with network slicing preservation, and so forth. In some implementations, based upon a predefined criterion, the rules-based implementation can automatically and/or dynamically interpret whether a user experience will be improved by implementing a delay or immediately (or nearly immediately) facilitating a fast return. In response thereto, the rule-based implementation can automatically interpret and carry out functions associated with a conditional fast return with associated network slicing information by employing a predefined and/or programmed rule(s) based upon any desired criteria.

In further detail, the system 1200 can continually monitor network equipment and associated network traffic conditions, applications executing on one or more UEs, a network congestion level, service and/or traffic needs at the UE (e.g., based on a service level agreement (SLA), user preferences, user expectations, and so on) to determine how a conditional fast return should be applied (e.g., via the machine learning and reasoning component 1202). The system can detect one or more signals from the UE and/or network equipment. The machine learning and reasoning component 1202 can facilitate execution of a process that analyzes the data. Based, at least in part, on the data, the machine learning and reasoning component 1202 can determine when to convey network slicing information, including when to use a voice over wireless (VoW) message, and so on. Depending on the decision, the system 1200 (e.g., through its various components) can facilitate conditional fast return with network slicing information that conforms to one or more policy rules and/or charging rules.

According to some implementations, seed data (e.g., a data set) can be utilized as initial input to the model 1204 to facilitate the training of the model 1204. In an example, if seed data is utilized, the seed data can be obtained from one or more historical data associated with service characteristics, network conditions, network traffic patterns, SLAs, user complaints, applications executing on the UE, and/or other information indicative of service type and/or service considerations. However, the disclosed embodiments are not limited to this implementation and seed data is not necessary to facilitate training of the model 1204. Instead, the model 1204 can be trained on new data received (e.g., input signals, a feedback loop, and so on).

The data (e.g., seed data and/or new data) can be collected and, optionally, labeled with various metadata. For example, the data can be labeled with an indication of the communication protocol being utilized for communication amongst the equipment, respective applications executing on the equipment, or other data, such as identification of respective equipment and the associated conditions and/or parameters expected at the UE, and so on.

Figure 13:
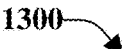
FIG. 13 illustrates an example embodiment of a mobile network platform that can implement and exploit one or more aspects of the disclosed subject matter described herein.

Described herein are systems, methods, articles of manufacture, non-transitory machine-readable medium, and other embodiments or implementations that can facilitate conditional fast return to stand alone advanced networks after voice fall back while preserving network slice configuration information. FIG. 13 illustrates an example embodiment 1300 of a mobile network platform 1310 that can implement and exploit one or more aspects of the disclosed subject matter described herein. Generally, wireless network platform 1310 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 1310 can be included in telecommunications carrier networks and can be considered carrier-side components as discussed elsewhere herein. Mobile network platform 1310 includes CS gateway node(s) 1312 which can interface CS traffic received from legacy networks such as telephony network(s) 1340 (e.g., public switched telephone network (PSTN), or public land mobile network (PLMN)) or a signaling system #7 (SS7) network 1360. Circuit switched gateway node(s) 1312 can authorize and authenticate traffic (e.g., voice) arising from such networks. Additionally, CS gateway node(s) 1312 can access mobility, or roaming, data generated through SS7 network 1360; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication. Mobile network platform 1310 can also include the MMEs, HSS/PCRFs, SGWs, and PGWs disclosed herein.

In addition to receiving and processing CS-switched traffic and signaling, PS gateway node(s) 1318 can authorize and authenticate PS-based data sessions with served mobile devices. Data sessions can include traffic, or content(s), exchanged with networks external to the wireless network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1370 can embody, at least in part, a service network(s) such as IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, wireless network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in wireless network platform 1310 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to wireless network platform 1310 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1375.

It is to be noted that server(s) 1314 can include one or more processors configured to confer at least in part the functionality of macro network platform 1310. To that end, the one or more processors can execute code instructions stored in memory 1330, for example. It should be appreciated that server(s) 1314 can include a content manager 1315, which operates in substantially the same manner as described hereinbefore.

In example embodiment 1300, memory 1330 can store information related to operation of wireless network platform 1310. Other operational information can include provisioning information of mobile devices served through wireless network platform 1310, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1330 can also store information from at least one of telephony network(s) 1340, WAN 1350, enterprise network(s) 1370, or SS7 network 1360. In an aspect, memory 1330 can be, for example, accessed as part of a data store component or as a remotely connected memory store.

Figure 14:
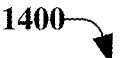
FIG. 14 illustrates an example, non-limiting, block diagram of a handset operable to engage in a system architecture that facilitates wireless communications according to one or more embodiments described herein.

Referring now to FIG. 14, illustrated is an example, non-limiting, block diagram of a handset 1400 operable to engage in a system architecture that facilitates wireless communications according to one or more embodiments described herein. Although a mobile handset is illustrated herein, it will be understood that other devices can be a mobile device and/or UE, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communications component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or decoded format.

A video processing component 1422 (e.g., a camera) can be provided for decoding encoded multimedia content. The video processing component 1422 can aid in facilitating the generation, editing, and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touchscreen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1436 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 1410, includes an indoor network radio transceiver 1413 (e.g., Wi-Fi transceiver). This function supports the indoor radio link, such as IEEE 802.11, for a dual-mode GSM handset. The handset 1400 can accommodate at least satellite radio services through a handset that can combine wireless voice and digital radio chipsets into a single handheld device.

Figure 15:
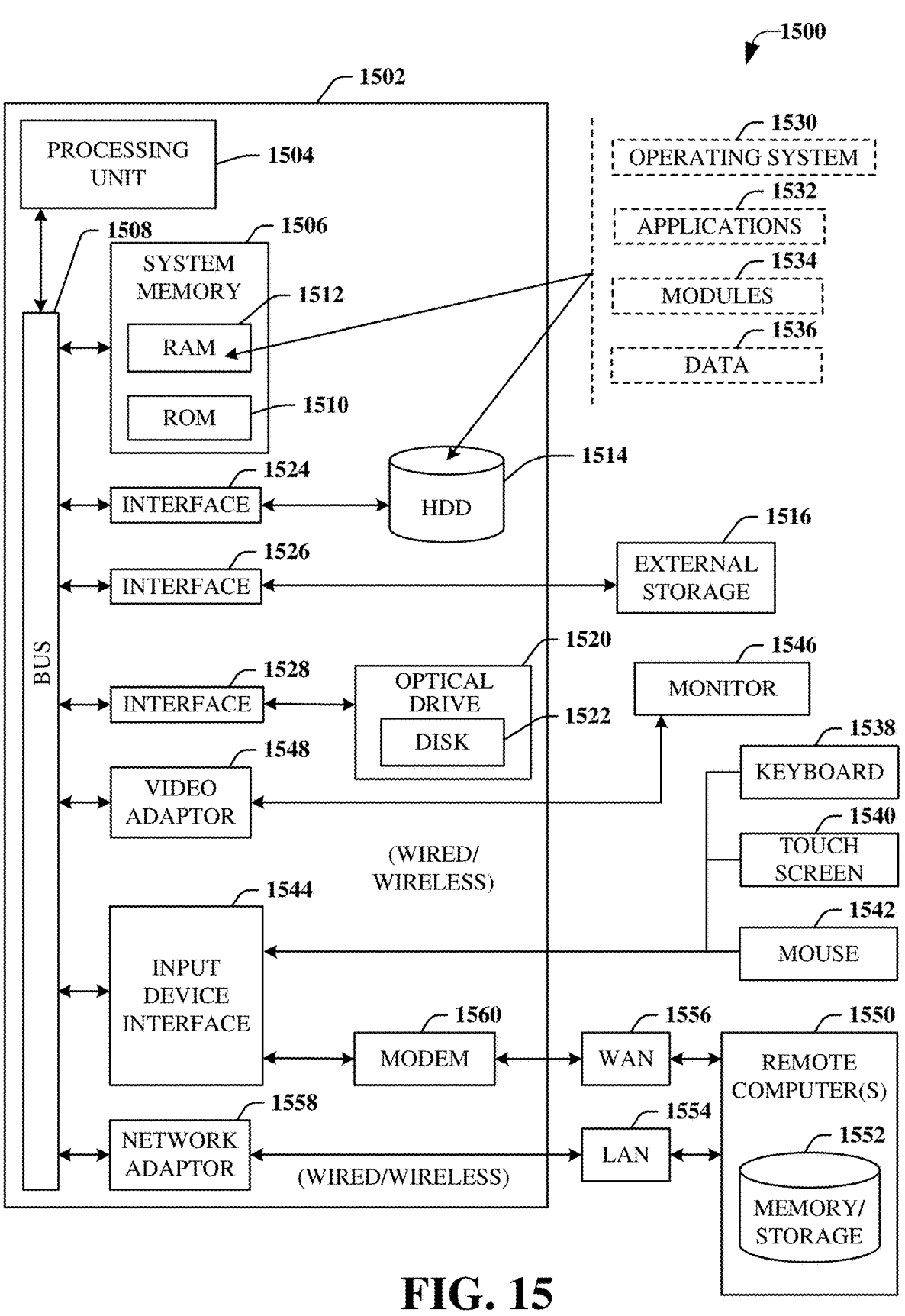
FIG. 15 illustrates a computing environment in which the various embodiments of described herein can be implemented.

In order to provide additional context for various embodiments described herein, FIG. 15 and the following discussion are intended to provide a brief, general description of a suitable computing environment 1500 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A Basic Input/Output System (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For example, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples and other means of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations.

That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

generating, by a system comprising a processor, network slices for a user equipment based on a service being executed at the user equipment, wherein the generating comprises employing a first microservice at a first network intelligent controller and a second microservice at a second network intelligent controller;

based on a first determination that the user equipment is to be handed over from first network equipment to second network equipment, facilitating, by the system, a first transmission that comprises first information indicative of a first handover from the first network equipment to the second network equipment and second information indicative of a network slicing configuration established for the user equipment prior to the first handover, wherein the first network equipment operates according to a first network communication protocol that supports network slicing, and the second network equipment operates according to a second network communication protocol that does not support network slicing, the second network communication protocol being different from the first network communication protocol; and based on a second determination that the user equipment is to be handed over from the second network equipment to third network equipment, facilitating, by the system, a second transmission that comprises third information indicative of a second handover from the second network equipment to the third network equipment and the second information indicative of the network slicing configuration established for the user equipment prior to the first handover to preserve the network slicing configuration established for the user equipment prior to the first handover.

2. The method of claim 1, further comprising:

retaining, by the system, the second information indicative of the network slicing configuration using a voice over wireless protocol; and forwarding, by the system, the second information indicative of the network slicing configuration to the second network equipment using the voice over wireless protocol.

3. The method of claim 1, wherein the first transmission and the second transmission are facilitated via the first network intelligent controller and the second network intelligent controller.

4. The method of claim 1, wherein the first network equipment and the third network equipment are configured to operate according to the first network communication protocol, and wherein the second network equipment is configured to operate according to the second network communication protocol different than the first network communication protocol.

5. The method of claim 4, wherein the first network communication protocol is a new radio network communication protocol, and wherein the second network communication protocol is a long term evolution network protocol.

6. The method of claim 1, wherein the first network equipment is configured to operate according to the first network communication protocol, and wherein the second network equipment is configured to operate according to the second network communication protocol different than the first network communication protocol.

7. The method of claim 6, wherein the first network communication protocol is a new radio network communication protocol, and wherein the second network communication protocol is a long term evolution network protocol.

8. The method of claim 1, wherein the first network equipment and the second network equipment are configured to operate according to at least a fifth generation network communication protocol.

9. First network equipment configured to operate according to a first network communication protocol, wherein the first network communication protocol does not support network slicing, the first network equipment comprising:

a processor; and a memory that stores executable instructions that, when executed by the processor, facilitate performance of operations, comprising:

receiving, from second network equipment, network slice configuration information for a user device during a first handover of the user device from the second network equipment to the first network equipment, wherein the network slice configuration information comprises information indicative of a first network slice and a second network slice generated via a microservice of a network intelligent controller, wherein the network slice configuration information is related to a user experience for a user of the user device, and wherein the second network equipment operates according to a second network communication protocol that is different from the first network communication protocol, and wherein the second network communication protocol supports network slicing; and transmitting, to third network equipment, the network slice configuration information for the user device during a second handover of the user device from the first network equipment to the third network equipment to preserve the user experience for the user of the user device subsequent to the first handover and the second handover, wherein the third network equipment operates according to a second network communication protocol.

10. The first network equipment of claim 9, wherein the network slice configuration information comprises a voice over new radio configuration and information indicative of new radio services assigned to the user device.

11. The first network equipment of claim 9, wherein the operations further comprise:

prior to the transmitting, retaining the network slice configuration information as user device context information representing a context applicable to the user device.

12. The first network equipment of claim 9, wherein the user device is an Internet of Things device, and wherein the first network equipment comprises a radio access network intelligent controller.

13. The first network equipment of claim 9, wherein the transmitting further comprises transmitting the network slice configuration information via a voice over wireless message.

14. The first network equipment of claim 9, wherein the second network equipment and the third network equipment are configured to operate according to a new radio network communication protocol.

15. The first network equipment of claim 9, wherein the second network equipment is configured to operate according to at least a fifth generation network communication protocol, and wherein the third network equipment is configured to operate according to a long term evolution network protocol.

16. The first network equipment of claim 9, wherein the first network equipment is deployed in a non-standalone deployment architecture, and wherein the second network equipment and the third network equipment are deployed in a standalone deployment architecture.

17. A non-transitory machine-readable medium, comprising executable instructions that, when executed by a processing system including a processor, facilitate performance of operations, the operations comprising:

generating network slices for a user equipment based on a service being executed at the user equipment, wherein the generating comprises employing a first microservice at a first network intelligent controller and a second microservice at a second network intelligent controller, wherein the network slices establish an end user experience for a user associated with the user equipment;

based on a determination that the user equipment is to be handed over from first network equipment operating according to a 5G new radio network communication protocol to second network equipment operating according to a long term evolution network communication protocol, facilitating a first transmission that comprises first information indicative of a handover from the first network equipment to the second network equipment and second information indicative of a network slicing configuration established for the user equipment prior to the handover, wherein the network slicing configuration comprises a voice over new radio configuration; and based on a determination that the user equipment is to be handed over from the second network equipment to third network equipment operating according to the 5G new radio network communication protocol, facilitating a second transmission that comprises third information indicative of a handover from the second network equipment to the third network equipment and the second information indicative of the network slicing configuration established for the user equipment prior to the handover, wherein the second information indicative of the network slicing configuration established for the user equipment prior to the handover enables the third network equipment to establish new network slices that preserve the end user experience for the user associated with the user equipment.

18. The non-transitory machine-readable medium of claim 17, wherein the facilitating the first transmission comprises:

transmitting the second information indicative of the network slicing configuration to the third network equipment using a voice over wireless protocol.

19. The non-transitory machine-readable medium of claim 17, wherein the operations further comprise:

prior to the second transmission, evaluating one or more policy rules or charging rules associated with the user equipment.

20. The non-transitory machine-readable medium of claim 17, wherein the network slicing configuration further comprises information indicative of at least one additional network slice assigned to the user equipment for a metaverse service.

\* \* \* \* \*